(12) United States Patent
Rojeski

(10) Patent No.: US 10,193,142 B2
(45) Date of Patent: Jan. 29, 2019

(54) LITHIUM-ION BATTERY ANODE INCLUDING PRELOADED LITHIUM

(71) Applicant: CF TRAVERSE LLC, San Francisco, CA (US)

(72) Inventor: Ronald A. Rojeski, Campbell, CA (US)

(73) Assignee: CF Traverse LLC, San Francisco, CA (US)

( * ) Notice: Subject to any disclaimer, the term of this patent is extended or adjusted under 35 U.S.C. 154(b) by 228 days.

(21) Appl. No.: 14/625,372

(22) Filed: Feb. 18, 2015

(65) Prior Publication Data

US 2015/0236342 A1  Aug. 20, 2015

Related U.S. Application Data

(63) Continuation-in-part of application No. 14/176,137, filed on Feb. 9, 2014, now Pat. No. 9,705,136, and a
(Continued)

(51) Int. Cl.
| | |
|---|---|
| *H01M 4/36* | (2006.01) |
| *H01M 4/86* | (2006.01) |
| *H01M 4/04* | (2006.01) |
| *H01M 4/38* | (2006.01) |
| *H01M 4/139* | (2010.01) |
| *H01M 4/1395* | (2010.01) |
| *H01M 10/0525* | (2010.01) |

(Continued)

(52) U.S. Cl.
CPC ......... *H01M 4/366* (2013.01); *H01M 4/0407* (2013.01); *H01M 4/139* (2013.01); *H01M 4/1395* (2013.01); *H01M 4/386* (2013.01); *H01M 4/8626* (2013.01); *H01M 10/0525* (2013.01); *H01M 12/08* (2013.01); *H01M 2004/027* (2013.01); *Y02E 60/128* (2013.01)

(58) Field of Classification Search
None
See application file for complete search history.

(56) References Cited

U.S. PATENT DOCUMENTS

| 3,775,216 A | 11/1973 | Frentrop |
| 4,329,403 A | 5/1982 | Baker |
| (Continued) | | |

FOREIGN PATENT DOCUMENTS

| DE | 112007000185 T5 | 12/2008 |
| EP | 2037516 B1 | 12/2011 |
| (Continued) | | |

OTHER PUBLICATIONS

"Silicon Nanotubes Outperform Carbon Nanotubes for Hydrogen Storage", Apr. 20, 2008.
(Continued)

*Primary Examiner* — Daniel S Gatewood
(74) *Attorney, Agent, or Firm* — Merchant & Gould PC

(57) ABSTRACT

An energy storage device includes a nano-structured cathode. The cathode includes a conductive substrate, an underframe and an active layer. The underframe includes structures such as nano-filaments and/or aerogel. The active layer optionally includes a catalyst disposed within the active layer, the catalyst being configured to catalyze the dissociation of cathode active material.

5 Claims, 8 Drawing Sheets

Related U.S. Application Data continuation-in-part of application No. 13/935,334, filed on Jul. 3, 2013, now Pat. No. 9,362,549, which is a continuation-in-part of application No. 13/779,409, filed on Feb. 27, 2013, now Pat. No. 9,349,544, which is a continuation-in-part of application No. 13/725,969, filed on Dec. 21, 2012, now Pat. No. 9,412,998, said application No. 14/625,372 is a continuation-in-part of application No. 13/725,969, filed on Dec. 21, 2012, now Pat. No. 9,412,998, which is a continuation-in-part of application No. 12/904,113, filed on Oct. 13, 2010, now Pat. No. 8,481,214, which is a continuation-in-part of application No. 12/392,525, filed on Feb. 25, 2009, now Pat. No. 8,420,258, said application No. 14/625,372 is a continuation-in-part of application No. 13/868,957, filed on Apr. 23, 2013, now abandoned, and a continuation-in-part of application No. PCT/US2014/011556, filed on Jan. 14, 2014.

(60) Provisional application No. 62/077,221, filed on Nov. 8, 2014, provisional application No. 61/978,161, filed on Apr. 10, 2014, provisional application No. 61/941,205, filed on Feb. 18, 2014, provisional application No. 61/910,955, filed on Dec. 2, 2013, provisional application No. 61/904,417, filed on Nov. 14, 2013, provisional application No. 61/887,447, filed on Oct. 7, 2013, provisional application No. 61/868,002, filed on Aug. 20, 2013, provisional application No. 61/806,819, filed on Mar. 29, 2013, provisional application No. 61/752,437, filed on Jan. 14, 2013, provisional application No. 61/677,317, filed on Jul. 30, 2012, provisional application No. 61/667,876, filed on Jul. 3, 2012, provisional application No. 61/615,179, filed on Mar. 23, 2012, provisional application No. 61/603,833, filed on Feb. 27, 2012, provisional application No. 61/578,545, filed on Dec. 21, 2011, provisional application No. 61/254,090, filed on Oct. 22, 2009, provisional application No. 61/130,679, filed on Jun. 2, 2008, provisional application No. 61/067,018, filed on Feb. 25, 2008.

(51) Int. Cl.
*H01M 12/08* (2006.01)
*H01M 4/02* (2006.01)

(56) References Cited

U.S. PATENT DOCUMENTS

| | | | |
|---|---|---|---|
| 5,674,642 A | 10/1997 | Le et al. | |
| 5,795,672 A | 8/1998 | Dearnaley | |
| 6,194,099 B1 | 2/2001 | Gernov et al. | |
| 6,815,121 B2 | 11/2004 | Dasgupta et al. | |
| 6,863,942 B2 | 3/2005 | Ren et al. | |
| 6,875,536 B2 | 4/2005 | Ovshinsky | |
| 7,094,499 B1 | 8/2006 | Hung | |
| 7,147,966 B2 | 12/2006 | Ren et al. | |
| 7,189,476 B1 | 3/2007 | Macklin et al. | |
| 7,402,829 B2 | 7/2008 | Green | |
| 7,442,284 B2 | 10/2008 | Ren et al. | |
| 7,745,047 B2 | 6/2010 | Zhamu et al. | |
| 7,854,991 B2 | 12/2010 | Hata et al. | |
| 7,938,996 B2 | 5/2011 | Baughman et al. | |
| 8,053,113 B2 | 11/2011 | Oh et al. | |
| 8,119,288 B2 | 2/2012 | Zhamu et al. | |
| 8,236,452 B2 | 8/2012 | Zhamu et al. | |
| 8,241,793 B2 | 8/2012 | Zhamu et al. | |
| 8,257,866 B2 | 9/2012 | Loveness | |
| 8,329,293 B2 | 12/2012 | Noguchi et al. | |
| 8,389,157 B2 | 3/2013 | Frank et al. | |
| 8,426,052 B2 | 4/2013 | Kozinsky et al. | |
| 8,450,012 B2 | 5/2013 | Cui et al. | |
| 8,481,214 B2 | 7/2013 | Rojeski | |
| 8,492,029 B2 | 7/2013 | Liu et al. | |
| 8,551,657 B2 | 10/2013 | Yoshida et al. | |
| 8,556,996 B2 | 10/2013 | Loveness et al. | |
| 8,669,009 B2 | 3/2014 | Yamakaji | |
| 2002/0018935 A1 | 2/2002 | Okada | |
| 2003/0044686 A1 | 3/2003 | Bushong et al. | |
| 2003/0178104 A1 | 9/2003 | Sekine | |
| 2004/0141908 A1 | 7/2004 | Hara et al. | |
| 2004/0234844 A1 | 11/2004 | Morris et al. | |
| 2004/0258984 A1 | 12/2004 | Ariel et al. | |
| 2005/0064291 A1 | 3/2005 | Sato | |
| 2005/0130043 A1 | 6/2005 | Gao et al. | |
| 2005/0230270 A1 | 10/2005 | Ren et al. | |
| 2005/0287440 A1 | 12/2005 | Chang et al. | |
| 2006/0002842 A1 | 1/2006 | Yoon | |
| 2006/0003226 A1 | 1/2006 | Sawa et al. | |
| 2006/0029857 A1 | 2/2006 | Cherepy et al. | |
| 2006/0046144 A1 | 3/2006 | Obrovac | |
| 2006/0057433 A1 | 3/2006 | Ando et al. | |
| 2006/0147797 A1 | 7/2006 | Wu | |
| 2006/0165988 A1 | 7/2006 | Chiang et al. | |
| 2007/0148549 A1 | 6/2007 | Kobayashi et al. | |
| 2007/0167101 A1 | 7/2007 | Naruse et al. | |
| 2007/0190422 A1 | 8/2007 | Morris | |
| 2007/0202403 A1* | 8/2007 | Oh | H01M 4/133 429/217 |
| 2007/0212538 A1 | 9/2007 | Niu | |
| 2008/0013258 A1 | 1/2008 | Viswanathan et al. | |
| 2008/0020193 A1 | 1/2008 | Jang et al. | |
| 2008/0020282 A1 | 1/2008 | Kim et al. | |
| 2008/0096110 A1 | 4/2008 | Bito et al. | |
| 2008/0299455 A1 | 4/2008 | Shiozaki et al. | |
| 2008/0160409 A1 | 7/2008 | Ishida et al. | |
| 2008/0193840 A1 | 8/2008 | Shirane | |
| 2008/0220329 A1 | 9/2008 | Kojima et al. | |
| 2008/0261116 A1 | 10/2008 | Burton et al. | |
| 2008/0311472 A1* | 12/2008 | Yamaguchi | H01M 4/1397 429/218.1 |
| 2009/0004566 A1 | 1/2009 | Shirane et al. | |
| 2009/0042102 A1 | 2/2009 | Cui et al. | |
| 2009/0053608 A1 | 2/2009 | Choi et al. | |
| 2009/0068553 A1 | 3/2009 | Firsich | |
| 2009/0169996 A1 | 7/2009 | Zhamu | |
| 2009/0186276 A1 | 7/2009 | Zhamu | |
| 2009/0208834 A1 | 8/2009 | Ramasubramanian et al. | |
| 2009/0214944 A1 | 8/2009 | Rojeski | |
| 2009/0305135 A1 | 12/2009 | Shi et al. | |
| 2010/0015933 A1 | 1/2010 | Kerselaers | |
| 2010/0136431 A1 | 6/2010 | Lee et al. | |
| 2010/0159305 A1 | 6/2010 | Yan et al. | |
| 2010/0178417 A1 | 7/2010 | Connor et al. | |
| 2010/0178531 A1 | 7/2010 | Amaratunga et al. | |
| 2010/0203362 A1 | 8/2010 | Lam et al. | |
| 2010/0216026 A1 | 8/2010 | Lopatin | |
| 2010/0221596 A1 | 9/2010 | Huggins et al. | |
| 2010/0258525 A1 | 10/2010 | Gorintin et al. | |
| 2010/0261058 A1 | 10/2010 | Lopatin et al. | |
| 2010/0297502 A1 | 11/2010 | Zhu et al. | |
| 2011/0027655 A1 | 2/2011 | Rojeski | |
| 2011/0070488 A1 | 3/2011 | West et al. | |
| 2011/0076542 A1 | 3/2011 | Farmer | |
| 2011/0104551 A1 | 5/2011 | Yang et al. | |
| 2011/0104553 A1 | 5/2011 | Pol et al. | |
| 2011/0143198 A1 | 6/2011 | Choi et al. | |
| 2011/0165462 A1 | 7/2011 | Zhamu et al. | |
| 2011/0165466 A1 | 7/2011 | Zhamu et al. | |
| 2011/0229761 A1 | 9/2011 | Cui et al. | |
| 2011/0281156 A1 | 11/2011 | Boren et al. | |
| 2012/0107582 A1 | 5/2012 | Metz et al. | |
| 2012/0115048 A1 | 5/2012 | Roev et al. | |
| 2012/0115049 A1 | 5/2012 | Rinzler et al. | |

(56) References Cited

U.S. PATENT DOCUMENTS

| | | |
|---|---|---|
| 2012/0229096 A1 | 9/2012 | Nazri |
| 2012/0250225 A1 | 10/2012 | Aria et al. |
| 2013/0143124 A1 | 6/2013 | Lee et al. |

FOREIGN PATENT DOCUMENTS

| | | | |
|---|---|---|---|
| FR | 2895752 B1 | 8/2010 | |
| JP | 2001210315 A | 8/2001 | |
| JP | 2002313319 A | 10/2002 | |
| JP | 2002313319 A | 10/2002 | |
| JP | 2003123749 A | 4/2003 | |
| JP | 2004319390 A | 11/2004 | |
| JP | 2006179431 A | 7/2006 | |
| JP | 2006179431 A | 7/2006 | |
| JP | 2010103051 A | 5/2010 | |
| JP | 2010103051 A | 5/2010 | |
| JP | 2010525549 A | 7/2010 | |
| JP | 2010525549 A | 7/2010 | |
| KR | 2011-125807 A | 11/2011 | |
| KR | 2011-0125808 A | 11/2011 | |
| WO | 2004054015 A2 | 6/2004 | |
| WO | 2007069389 A1 | 6/2007 | |
| WO | WO 2007071778 A1 | 6/2007 | |
| WO | 2007095013 A1 | 8/2007 | |
| WO | WO 2008033827 | 3/2008 | |
| WO | 2009108731 A2 | 9/2009 | |
| WO | 2010100599 A1 | 9/2010 | |
| WO | 2010129827 A1 | 11/2010 | |
| WO | WO 2010135446 | 11/2010 | |
| WO | 2011/041468 A1 | 4/2011 | |
| WO | 2011060017 A2 | 5/2011 | |
| WO | 2011068911 A3 | 6/2011 | |
| WO | 2011076475 A1 | 6/2011 | |
| WO | 2011152190 A1 | 8/2011 | |
| WO | 2011119614 A2 | 9/2011 | |
| WO | 2011149958 A2 | 12/2011 | |
| WO | 2012002136 A1 | 1/2012 | |
| WO | 2012054767 A2 | 4/2012 | |
| WO | 2012069245 A1 | 5/2012 | |
| WO | 2012084570 A1 | 6/2012 | |
| WO | 2012150012 A1 | 11/2012 | |
| WO | 2013096931 A1 | 6/2013 | |
| WO | 2013126372 A1 | 8/2013 | |
| WO | 2013130677 A1 | 9/2013 | |
| WO | 2014008433 A1 | 1/2014 | |

OTHER PUBLICATIONS

U.S. Appl. No. 13/039,031, Ghryn E. Loveness, Information Disclosure Statement, Jul. 5, 2012.
U.S. Appl. No. 13/039,031, Ghryn E. Loveness, Response to Restriction Requirement, dated Mar. 21, 2012.
U.S. Appl. No. 13/039,031, Ghyrn E. Loveness, Information Disclosure Statement, Mar. 21, 2012.
U.S. Appl. No. 13/039,031, Ghyrn E. Loveness, Non-Final Office Action, dated Feb. 21, 2012.
U.S. Appl. No. 13/039,031, Ghyrn E. Loveness, Notice of Allowance and Fees Due, dated Jul. 26, 2012.
U.S. Appl. No. 13/039,031, Ghyrn E. Loveness, Preliminary Amendment, dated Nov. 29, 2011.
U.S. Appl. No. 13/039,031, Loveness, et al., Information Disclosure Statement, Nov. 22, 2011.
U.S. Appl. No. 13/039,031, Loveness, Issue Notification, dated Aug. 15, 2012.
U.S. Appl. No. 13/069,212, Yi Cui, Non-Final Office Action, Apr. 15, 2013.
U.S. Appl. No. 13/277,821, Zuqin Liu, et al., Response to Restriction Requirement, dated Nov. 5, 2012.
U.S. Appl. No. 13/277,821, Zuquin, Liu, Non-Final Office Action, dated Feb. 25, 2013.
Berger, Michale, "Using nanotechnology to improve Li-ion battery performance", Nanowerk Spotlight (www.nanowerk.com), Apr. 7, 2008.
Bergeron, Louis, Nanoparticle electrode for batteries could make large-scale power storage on the energy grid feasible, say Stanford researchers.
Bourzac, Katherine, "Doubling Lithium-Ion Battery Storage", Technology Review, pp. 1-2, Sep. 17, 2010.
Chan, Candace K., et al., "High-performance lithium battery anodes using silicon nanowires", Nature Nanotechnology, 3, 31-36, Dec. 16, 2007.
Chen, L.H., et al., "Control of carbon nanotube morphology by change of applied bias field during growth", Applied Physics Letters, vol. 85, No. 22, Nov. 29, 2004.
CN200980106188.5, 2nd Office Action, dated Apr. 22, 2013.
Cui, Li-Feng, et al., Crystalline-Amorphous Core-Shell Silicon Nanowires . . . : Nano Letters, Jan. 14, 2009.
Cui, Yi, et al., "Nanowire Lithium-Ion Batteries as Electrochemical Energy Storage for Electric Vehicles", Jun. 1, 2009.
DE112009000443.1 First Office Action, dated Jan. 14, 2014, 5 pgs.
Eom, J. Y., et al., "Electrochemical Insertion of Lithium into Multiwalled Carbon Nanotube/Silicon Composites Produced by Ballmilling", J. of The Electrochemical Soc., 2006.
Hossain, Sohrab, et al., "Carbon Fiber Composite—A High Capacity Anode for Lithium-ion Batteries", LiTech, LLC, Oct. 7-12, 2007.
International Preliminary Report on Patentability, PCT/US2009/035195, Rojeski, Ronald Anthony, dated Sep. 10, 2010.
International Search Report and Written Opinion, PCT/US2009/035195, Rojeski, Ronald Anthony, dated May 5, 2009.
International Search Report and Written Opinion, PCT/US2013/049382, Rojeski, dated Oct. 8, 2013.
International Search Report and Written Opinion, PCT/US2014/011556, Rojeski, dated Jan. 12, 2015.
JP2010-546867 Non-Final Office Action, dated Jul. 30, 2013.
Kim, Nyung-Hoon, et al., "Electrochemical characteristics of Si/Mo multilayer anode for Li-ion batteries", Rev. Mex. F'is. S 53(1) (2007) 17-20.
KR10-2010-7018725, Preliminary Rejection, dated May 30, 2013.
Liangbing, Hu, et al., "Thin, Flexible Secondary Li-Ion Paper Batteries", Department of Materials Science and Engineering, Stanford University, Stanford, California 94305, pp. A-F.
Lu, Chenguang, et al., "Controlling the Diameter of Carbon Nanotubes in Chemical Vapor Deposition Method by Carbon Feeding", J. Phys. Chem. B 2006, 110, 20254-20257.
MIT, "Nanoscientists Fired Up about Battery Alternative", Nanotechnology, Feb. 8, 2006.
Patel, "Nanowire Advance for Lithium Batteries", Technology Review, Aug. 14, 2009.
PCT/US2010/034106, Search Report, dated Feb. 7, 2011.
PCT/US2010/036235, Search Report, dated Jan. 28, 2011.
PCT/US2010/036237, Search Report, dated Feb. 1, 2011.
PCT/US2011/026816, Search Report, dated Oct. 18, 2011.
PCT/US2011/037767, Search Report, dated Jan. 16, 2012.
PCT/US2013/028108, International Search Report and Written Opinion, dated May 3, 2013.
Poizot, P., et al., Nano-sized Transition-metal oxides as negative-electrode materials for lithium-ion batteries, Nature, vol. 407:496-499, Sep. 28, 2000.
Redden, Chris, "Nanowire Formation in Anodic Alumina Templates", pp. 1-13, Shelby Hall Room 151, 12:45pm, Nov. 11, 2008.
Sharma, Kal Renganathan, "Control of Diameter during Cnt Synthesis in the Three Methods", 2007.
Shwartz, Mark, Stanford Scientists Create Novel Silicon Electrodes that Improve Lithium-ion Battery Performance.
Signorelli, Riccardo, et al., "Carbon Nanotube Enhanced Ultracapacitor", MIT Laboratory for Electromagnetic and Electronic Systems, Dec. 2005.
Tarascon, J. M., "Towards the Next Generation of Li-ion Batteries Based on Nanomaterials", Apr. 3, 2006.
Yao, Yagang, et al., "Temperature-mediated growth of single-walled carbon-nanotube intramolecular juncitons," Nature Materials, vol. 6, Apr. 2007.
Hu, et al., "Si Nanoparticle-Decorated Si Nanowire Networks for Li-Ion Battery Anodes", Chem. Commun. Sep. 10, 2010, vol. 47, pp. 367-369.

(56) References Cited

OTHER PUBLICATIONS

Search Report and Written Opinion, Singapore application No. 11201405271X, dated Mar. 11, 2015.
Lee et al, "Synthesis of Vertically Aligned Carbon Nanofiber Films by RF Magnetron Sputtering", Mat Res Soc Symp Proc, vol. 675, 1-5, 2001.
JP2010-236771 Office Action dated Jan. 21, 2014, pp. 1-10.
DE11 2009 000 443.1 First Office Action dated Jan. 14, 2014, pp. 1-5.
DE11 2009 000 443.1 Response to First Office Action dated Jun. 2, 2014, pp. 1-34.
CN200980106188.5 Third Office Action dated Jan. 3, 2014, pp. 1-15.
CN201010519800.6 First Office Action dated May 1, 2014, pp. 1-11.
KR10-2013-7020275 Examiner's Rejection issued . . . , pp. 1-3.
CN200980106188.5 Third Office Action Response, filed Mar. 17, 2014, pp. 1-10.
N. E. I. C. (NEIC), Greenhouse Gases, Climate Change, and Energy, http://www.eia.gov/oiaf/1605/ggccebro/chapter1.html, Accessed Mar. 12, 2015, 2015.
D. P. TANS, Trends in Atmospheric Carbon Dioxide, http://www.esrl.noaa.gov/gmd/ccgg/trends/, Accessed Jan. 28, 2015, 2015.
A. Luntz, J. Phys. Chem. Lett., 2015, 6, 300-301.
S. Kann, M. Shiao, C. Honeyman, N. Litvak, J. Jones and L. Cooper, US solar market insight report: 2015 year-in-review—Executive summary, 2015.
D. R. Dunn, J. Barrick, A. Sweeney, N. Davis, S. Thapa, R. S. Hankey, S. Kaplan, P. Smith and P. Lindstrom, ed. U. E. I. Administration, 2015.
B. Dunn, H. Kamath and J. M. Tarascon, Science, 2011, 334, 928-935.
R. Hensley, J. Newman and M. Rogers, McKinsey Quarterly, 2012, 3, 5-50.
S. J. Gerssen-Gondelach and A. P. C. Faaij, J. Power Sources, 2012, 212, 111-129.
A. J. Bard and L. R. Faulkner, Electrochemical methods: fundamentals and applications, Wiley New York, 1980.
M. Winter and R. J. Brodd, Chem. Rev., 2004, 104, 4245-4270.
W. Lu and L. Dai, Carbon nanotube supercapacitors, INTECH Open Access Publisher, 2010.
D. V. Ragone, Review of battery systems for electrically powered vehicles, SAE Technical Paper, 1968.
B. E. Conway, Electrochemical supercapacitors: scientific fundamentals and technological applications, Kluwer Academic/Plenum: New York, 1999.
Q. Ngo et al., Nano Letters, 2004, 4, 2403-2407.
M. Yoshio, R. J. Brodd and A. Kozawa, Lithium-Ion Batteries, Springer, 2009.
T. Christen and M. W. Carlen, J. Power Sources, 2000, 91, 210-216.
M. S. Whittingham, Science, 1976, 192, 1126-1127.
B. Kumar and J. Kumar, J. Electrochem. Soc., 2010, 157, A611.
D. Aurbach, E. Zinigrad, Y. Cohen and H. Teller, Solid State Ionics, 2002, 148, 405-416.
T. R. Jow, K. Xu, O. Borodin and M. Ue, Electrolytes for lithium and lithium-ion batteries, Springer, 2014.
A. S. Arico, P. Bruce, B. Scrosati, J. M. Tarascon and W. van Schalkwijk, Nat. Mater., 2005, 4, 366-377.
W. J. Zhang, J. Power Sources, 2011, 196, 13-24.
A. Magasinski, P. Dixon, B. Hertzberg, A. Kvit, J. Ayala and G. Yushin, Nat. Mater., 2010, 9, 353-358.
C. K. Chan, H. Peng, G. Liu, K. McIlwrath, X. F. Zhang, R. A. Huggins and Y. Cui, Nat. Nanotechnol., 2008, 3, 31-35.
M. H. Park, M. G. Kim, J. Joo, K. Kim, J. Kim, S. Ahn, Y. Cui and J. Cho, Nano Lett., 2009, 9, 3844-3847.
L. M. Sun, X. H. Wang, R. A. Susantyoko and Q. Zhang, Carbon, 2015, 82, 282-287.
C. K. Chan, X. F. Zhang and Y. Cui, Nano Lett., 2008, 8, 307-309.
L. P. Tan, Z. Y. Lu, H. T. Tan, J. X. Zhu, X. H. Rui, Q. Y. Yan and H. H. Hng, J. Power Sources, 2012, 206, 253-258.
T. Kennedy, E. Mullane, H. Geaney, M. Osiak, C. O'Dwyer and K. M. Ryan, Nano Lett., 2014, 14, 716-723.
A. Boukamp, G. C. Lesh and R. A. Huggins, J. Electrochem. Soc., 1981, 128, 725-729.
H. Kim, C.-Y. Chou, J. G. Ekerdt and G. S. Hwang, J. Phys. Chem. C, 2011, 115, 2514-2521.
M. R. Zamfir, H. T. Nguyen, E. Moyen, Y. H. Lee and D. Pribat, J. Mater. Chem. A, 2013, 1, 9566-9586.
S. Ohara, J. Suzuki, K. Sekine and T. Takamura, J. Power Sources, 2004, 136, 303-306.
J. P. Maranchi, A. F. Hepp, A. G. Evans, N. T. Nuhfer and P. N. Kumta, J. Electrochem. Soc., 2006, 153, A1246-A1253.
J. P. Maranchi, A. F. Hepp and P. N. Kumta, Electrochem. Solid St, 2003, 6, A198-A201.
T. S. Arthur, D. J. Bates, N. Cirigliano, D. C. Johnson, P. Malati, J. M. Mosby, E. Perre, M. T. Rawls, A. L. Prieto and B. Dunn, MRS Bull., 2011, 36, 523-531.
J. W. Long, B. Dunn, D. R. Rolison and H. S. White, Chem. Rev., 2004, 104, 4463-4492.
J. M. Tarascon and M. Armand, Nature, 2001, 414, 359-367.
J. Molenda and J. Marzec, Funct. Mater. Lett, 2008, 01, 91-95.
J. H. Ryu, J. W. Kim, Y. E. Sung and S. M. Oh, Electrochem Solid St, 2004, 7, A306-A309.
U. Kasavajjula, C. S. Wang and A. J. Appleby, J. Power Sources, 2007, 163, 1003-1039.
H. Chen, J. Xu, P. C. Chen, X. Fang, J. Qiu, Y. Fu and C. Zhou, ACS Nano, 2011, 5, 8383-8390.
L. F. Cui, Y. Yang, C. M. Hsu and Y. Cui, Nano Lett., 2009, 9, 3370-3374.
P. C. Chen, J. Xu, H. T. Chen and C. W. Zhou, Nano Research, 2011, 4, 290-296.
W. Wang, R. Epur and P. N. Kumta, Electrochem. Commun., 2011, 13, 429-432.
J. Qu, H. Q. Li, J. J. Henry, S. K. Martha, N. J. Dudney, H. B. Xu, M. F. Chi, M. J. Lance, S. M. Mahurin, T. M. Besmann and S. Dai, J. Power Sources, 2012, 198, 312-317.
D. Choi, W. Wang and Z. Yang, Chapter 1, Material Challenges and Perspectives, CRC Press, 2011.
G. Hautier, A. Jain, S. P. Ong, B. Kang, C. Moore, R. Doe and G. Ceder, Chem. Mater., 2011, 23, 3495-3508.
S. Curtarolo, G. L. Hart, M. B. Nardelli, N. Mingo, S. Sanvito and O. Levy, Nat. Mater., 2013, 12, 191-201.
M. S. Whittingham, Chem. Rev., 2004, 104, 4271-4301.
B. Wang, W. Al Abdulla, D. Wang and X. S. Zhao, Energ. Environ. Sci., 2015, 8, 869-875.
G. N. Zhu, Y. G. Wang and Y. Y. Xia, Energ. Environ. Sci., 2012, 5, 6652-6667.
X. H. Wang, X. W. Li, X. L. Sun, F. Li, Q. M. Liu, Q. Wang and D. Y. He, J. Mater. Chem., 2011, 21, 3571-3573.
F. Y. Cheng, H. B. Wang, Z. Q. Zhu, Y. Wang, T. R. Zhang, Z. L. Tao and J. Chen, Energ. Environ. Sci., 2011, 4, 3668-3675.
J. W. Fergus, J. Power Sources, 2010, 195, 939-954.
V. Augustyn, P. Simon and B. Dunn, Energ. Environ. Sci., 2014, 7, 1597-1614.
J. Wang, J. Polleux, J. Lim and B. Dunn, J. Phys. Chem. C, 2007, 111, 14925-14931.
M. M. Thackeray, Handbook of Battery Materials, 1998, DOI: 10.1002/9783527611676.ch13, 293-321.
Z. G. Yang, D. Choi, S. Kerisit, K. M. Rosso, D. H. Wang, J. Zhang, G. Graff and J. Liu, J. Power Sources, 2009, 192, 588-598.
H. Helmholtz, Annalen der Physik and Chemie, 1853, 65, 211-233.
B. E. Conway, J. O. Bockris and I. A. Ammar, Transactions of the Faraday Society, 1951, 47, 756-766.
M. Gouy, Journal de Physique Théorique et Appliquée, 1910, 9, 457-468.
D. L. Chapman, Philosophical Magazine Series 6, 1913, 25, 475-481.
O. Stern, Zeit. Elektrochem, 1924, 30, 508-516.
W. Lu, R. Hartman, L. T. Qu and L. M. Dai, J. Phys. Chem. Lett., 2011, 2, 655-660.
L. L. Zhang, R. Zhou and X. S. Zhao, J. Mater. Chem., 2010, 20, 5983-5992.

(56) References Cited

OTHER PUBLICATIONS

M. Lu, F. Beguin and E. Frackowiak, Supercapacitors: Materials, Systems and Applications, John Wiley & Sons, 2013.
G. Wang, L. Zhang and J. Zhang, Chem. Soc. Rev., 2012, 41, 797-828.
C. C. Yu, L. X. Zhang, J. L. Shi, J. J. Zhao, J. H. Gao and D. S. Yan, Adv. Funct. Mater., 2008, 18, 1544-1554.
V. Subramanian, H. Zhu, R. Vajtai, P. M. Ajayan and B. Wei, J. Mater. Chem. B, 2005, 109, 20207-20214.
S. C. Pang, M. A. Anderson and T. W. Chapman, J. Electrochem. Soc., 2000, 147, 444-450.
J. N. Broughton and M. J. Brett, Electrochim. Acta, 2004, 49, 4439-4446.
B. Djurfors, J. N. Broughton, M. J. Brett and D. G. Ivey, J. Power Sources, 2006, 156, 741-747.
C. C. Hu and C. C. Wang, J. Electrochem. Soc., 2003, 150, A1079-A1084.
L. Z. Wang, Y. Omomo, N. Sakai, K. Fukuda, I. Nakai, Y. Ebina, K. Takada, Watanabe and T. Sasaki, Chem. Mater., 2003, 15, 2873-2878.
M. Toupin, T. Brousse and D. Belanger, Chem. Mater., 2004, 16, 3184-3190.
Y. T. Wu and C. C. Hu, J. Electrochem. Soc., 2004, 151, A2060-A2066.
V. Subramanian, H. W. Zhu and B. Q. Wei, Pure Appl. Chem., 2008, 80, 2327-2343.
Z. F. Ren, Z. P. Huang, J. W. Xu, J. H. Wang, P. Bush, M. P. Siegal and P. N. Provencio, Science, 1998, 282, 1105-1107.
B. A. Cruden, A. M. Cassell, Q. Ye and M. Meyyappan, J. Appl. Phys., 2003, 94, 4070-4078.
A. V. Melechko, V. I. Merkulov, T. E. McKnight, M. A. Guillorn, K. L. Klein, D. H. Lowndes and M. L. Simpson, J. Appl. Phys., 2005, 97.
J. Li and G. P. Pandey, Annu. Rev. Phys. Chem., 2015, 66, null.
E. C. Landis, K. L. Klein, A. Liao, E. Pop, D. K. Hensley, A. V. Melechko and R. J. Hamers, Chem. Mater., 2010, 22, 2357-2366.
Q. Ngo, T. Yamada, M. Suzuki, Y. Ominami, A. M. Cassell, J. Li, M. Meyyappan and C. Y. Yang, IEEE T. Nanotechnol., 2007, 6, 688-695.
M. Meyyappan, L. Delzeit, A. Cassell and D. Hash, Plasma Sources Sci T, 2003, 12, 205-216.
R. A. Susantyoko, X. Wang, L. Sun, K. L. Pey, E. Fitzgerald and Q. Zhang, Carbon, 2014, 77, 551-559.
R. A. Susantyoko, X. H. Wang, Q. Z. Xiao, E. Fitzgerald and Q. Zhang, Carbon, 2014, 68, 619-627.
X. Wang, R. A. Susantyoko, Y. Fan, L. Sun, Q. Xiao and Q. Zhang, Small, 2014, 10, 2826-2829, 2742.
Q. Z. Xiao, Y. Fan, X. H. Wang, R. A. Susantyoko and Q. Zhang, Energ. Environ. Sci., 2014, 7, 655-661.
G. A. Malek, E. Brown, S. A. Klankowski, J. Liu, A. J. Elliot, R. Lu, J. Li and J. Wu, ACS Appl. Mater. Inter., 2014, 6, 6865-6871.
Y. Zheng, Kansas State University, 2014.
J. W. Liu, J. Essner and J. Li, Chem. Mater., 2010, 22, 5022-5030.
L. Z. Swisher, L. U. Syed, A. M. Prior, F. R. Madiyar, K. R. Carlson, T. A. Nguyen, D. H. Hua and J. Li, J. Phys. Chem. C, 2013, 117, 4268-4277.
L. Z. Swisher, A. M. Prior, S. Shishido, T. A. Nguyen, D. H. Hua and J. Li, Biosens. Bioelectron., 2014, 56, 129-136.
Madiyar et al, in Advances in Applied Nanotechnology for Agriculture, American Chemical Society, 2013, vol. 1143, ch. 6, pp. 109-124.
F. R. Madiyar, L. U. Syed, C. T. Culbertson and J. Li, Electrophoresis, 2013, 34, 1123-1130.
F. R. Madiyar, S. Bhana, L. Z. Swisher, C. T. Culbertson, X. Huang and J. Li, Nanoscale, 2015, 7, 3726-3736.
G. Baysinger, ed., CRC Handbook of Chemistry and Physics, National Institute of Standards and Technology, 2015.
M. Ohring, Materials science of thin films, Academic press, 2001.
W. Wang and P. N. Kumta, ACS Nano, 2010, 4, 2233-2241.
Q. Ngo, A. M. Cassell, A. J. Austin, L. Jun, S. Krishnan, M. Meyyappan and C. Y. Yang, IEEE Electron Device Lett., 2006, 27, 221-224.
L. U. Syed, J. W. Liu, A. M. Prior, D. H. Hua and J. Li, Electroanal, 2011, 23, 1709-1717.
E. C. Landis and R. J. Hamers, J. Mater. Chem. C, 2008, 112, 16910-16918.
D. Aurbach, M. D. Levi, E. Levi and A. Schechter, J. Phys. Chem. B, 1997, 101, 2195-2206.
D. Aurbach, Y. Talyosef, B. Markovsky, E. Markevich, E. Zinigrad, L. Asraf, J. S. Gnanaraj and H. J. Kim, Electrochim. Acta, 2004, 50, 247-254.
G. K. Simon and T. Goswami, Metallurgical and Materials Transactions a-Physical Metallurgy and Materials Science, 2011, 42A, 231-238.
P. B. Balbuena et al., Lithium-ion Batteries: Solid-Electrolyte Interphase, Imperial College Press, River Edge, NJ, 2004.
D. R. Lide, ed., CRC Handbook of Chemistry and Physics, CRC Press, New York, 2004.
M. Winter et al., in Lithium Batteries: Science and Technology, eds. G.-A. Nazri and G. Pistoia, Kluwer Academic Publishers, Boston, 2004, ch. 5, pp. 144-194.
T. D. Nguyen-Vu, H. Chen, A. M. Cassell, R. Andrews, M. Meyyappan and J. Li, Small, 2006, 2, 89-94.
W. Wan, Q. Zhang, Y. Cui and E. Wang, J Phys Condens Matter, 2010, 22, 415501.
J. R. Szczech and S. Jin, Energ. Environ. Sci., 2011, 4, 56-72.
V. Etacheri, R. Marom, R. Elazari, G. Salitra and D. Aurbach, Energ. Environ. Sci., 2011, 4, 3243-3262.
D. Aurbach, eds. W. Schalkwijk and B. Scrosati, Springer US, 2002, DOI: 10.1007/0-306-47508-1_2, pp. 7-77.
I. I. Abdulhalim, R. Beserman and R. Weil, Phys Rev B Condens Matter, 1989, 39, 1081-1091.
S. A. Klankowski, R. A. Rojeski, B. A. Cruden, J. Liu, J. Wu and J. Li, J. Mater. Chem. A, 2013, 1, 1055-1064.
J. A. Thornton, J. Vac. Sci. Technol. A, 1986, 4, 3059.
R. Messier, A. P. Girl and R. A. Roy, J. Vac. Sci. Technol. A, 1984, 2, 500-503.
I. Petrov, P. B. Barna, L. Hultman and J. E. Greene, J. Vac. Sci. Technol. A, 2003, 21, S117-S128.
Y. Fan, Q. Zhang, Q. Z. Xiao, X. H. Wang and K. Huang, Carbon, 2013, 59, 264-269.
B. B. Li, D. P. Yu and S. L. Zhang, Phys. Rev. B, 1999, 59, 1645-1648.
H. Kim and J. Cho, Nano Lett., 2008, 8, 3688-3691.
L. Martin, H. Martinez, M. Ulldemolins, B. Pecquenard and F. Le Cras, Solid State Ionics, 2012, 215, 36-44.
L. B. Chen, K. Wang, X. H. Xie and J. Y. Xie, J. Power Sources, 2007, 174, 538-543.
J. R. MacDonald, in Superionic Conductors, eds. G. Mahan and W. Roth, Springer US, 1976, DOI: 10.1007/978-1-4615-8789-7_6, ch. 6, pp. 81-97.
R. Ruffo, S. S. Hong, C. K. Chan, R. A. Huggins and Y. Cui, J. Phys. Chem. C, 2009, 113, 11390-11398.
T. Zhang, H. P. Zhang, L. C. Yang, B. Wang, Y. P. Wu and T. Takamur, Electrochim. Acta, 2008, 53, 5660-5664.
B. Markovsky, M. D. Levi and D. Aurbach, Electrochim. Acta, 1998, 43, 2287-2304.
N. Ding, J. Xu, Y. X. Yao, G. Wegner, X. Fang, C. H. Chen and I. Lieberwirth, Solid State Ionics, 2009, 180, 222-225.
S. I. Lee, U. H. Jung, Y. S. Kim, M. H. Kim, D. J. Ahn and H. S. Chun, Korean J. Chem. Eng., 2002, 19, 638-644.
Y. M. Lee, J. Y. Lee, H. T. Shim, J. K. Lee and J. K. Park, J. Electrochem. Soc., 2007, 154, A515-A519.
J. H. Cho and S. T. Picraux, Nano Lett., 2014, 14, 3088-3095.
E. Radvanyi, K. Van Havenbergh, W. Porcher, S. Jouanneau, J. S. Bridel, S. Put and S. Franger, Electrochim. Acta, 2014, 137, 751-757.
S. A. Klankowski, G. P. Pandey, B. A. Cruden, J. W. Liu, J. Wu, R. A. Rojeski and J. Li, J. Power Sources, 2015, 276, 73-79.
K. Ozawa, Lithium Ion Rechargeable Batteries: Materials, Technology, and New Applications, John Wiley & Sons, 2012.

(56) References Cited

OTHER PUBLICATIONS

B. Markovsky, A. Rodkin, G. Salitra, Y. Talyosef, D. Aurbach and H. J. Kim, J. Electrochem. Soc., 2004, 151, A1068-A1076.
J. Wang, Y. K. Zhou, Y. Y. Hu, R. O'Hayre and Z. P. Shao, J. Phys. Chem. C, 2011, 115, 2529-2536.
L. Kavan, J. Solid State Electrochem., 2014, 18, 2297-2306.
R. Van Noorden, Nature, 2014, 507, 26-28.
M. Armand and J. M. Tarascon, Nature, 2008, 451, 652-657.
P. Simon, Y. Gogotsi and B. Dunn, Science, 2014, 343, 1210-1211.
P. G. Bruce, B. Scrosati and J. M. Tarascon, Angew. Chem. Int. Ed. Engl., 2008, 47, 2930-2946.
M. Okubo, E. Hosono, J. Kim, M. Enomoto, N. Kojima, T. Kudo, H. Zhou and I. Honma, J. Am. Chem. Soc., 2007, 129, 7444-7452.
S. A. Klankowski, R. A. Rojeski, B. A. Cruden, J. W. Liu, J. Wu and J. Li, J. Mater. Chem. A, 2013, 1, 1055-1064.
H. Lindstrom, S. Sodergren, A. Solbrand, H. Rensmo, J. Hjeim, A. Hagfeldt and S. E. Lindquist, J. Phys. Chem. B, 1997, 101, 7717-7722.
H. Zhang and P. V. Braun, Nano Lett., 2012, 12, 2778-2783.
Z. Weng, F. Li, D. W. Wang, L. Wen and H. M. Cheng, Angew. Chem. Int. Ed. Engl., 2013, 52, 3722-3725.
T. Aida, K. Yamada and M. Morita, Electrochem Solid St, 2006, 9, A534-A536.
S. L. Zhang and N. Pan, Advanced Energy Materials, 2015, 5.
C. C. Hu, K. H. Chang, M. C. Lin and Y. T. Wu, Nano Lett., 2006, 6, 2690-2695.
P. Simon and Y. Gogotsi, Nat. Mater., 2008, 7, 845-854.
D. R. Rolison, J. W. Long, J. C. Lytle, A. E. Fischer, C. P. Rhodes, T. M. McEvoy, M. E. Bourg and A. M. Lubers, Chem. Soc. Rev., 2009, 38, 226-252.
Z. B. Lei, J. T. Zhang and X. S. Zhao, J. Mater. Chem., 2012, 22, 153-160.
J. Desilvestro and O. Haas, J. Electrochem. Soc., 1990, 137, C5-C22.
D. M. Adams, et al.Chem. B, 2003, 107, 6668-6697.
R. Huggins, Advanced batteries: materials science aspects, Springer, 2008.
Y. Yang,et al Metal Oxide Nanostructures, eds. J. Wu, J. Cao, W.-Q. Han, A. Janotti and H.-C. Kim, Springer New York, 2012, vol. 149, ch. 12, pp. 269-302.
J. E. Weston and B. C. H. Steele, J. Appl. Electrochem., 1980, 10, 49-53.
W. Chen, R. B. Rakhi, Q. X. Wang, M. N. Hedhili and H. N. Alshareef, Adv. Funct. Mater., 2014, 24, 3130-3143.
F. Li, Y. Xing, M. Huang, K. L. Li, T. T. Yu, Y. X. Zhang and D. Losic, J. Mater. Chem. A, 2015, DOI: 10.1039/c5ta00634a, 10.1039/C1035TA00634A.
K. Zhang, X. Han, Z. Hu, X. Zhang, Z. Tao and J. Chen, Chem. Soc. Rev., 2015, 44, 699-728.
M. Zhi, C. Xiang, J. Li, M. Li and N. Wu, Nanoscale, 2013, 5, 72-88.
P. Simon and Y. Gogotsi, Acc. Chem. Res., 2013, 46, 1094-1103.
Z. Fan, J. H. Chen, M. Y. Wang, K. Z. Cui, H. H. Zhou and W. Kuang, Diamond Relat. Mater., 2006, 15, 1478-1483.
S. B. Ma, K. Y. Ahn, E. S. Lee, K. H. Oh and K. B. Kim, Carbon, 2007, 45, 375-382.
J. Yan, Z. J. Fan, T. Wei, J. Cheng, B. Shao, K. Wang, L. P. Song and M. L. Zhang, J. Power Sources, 2009, 194, 1202-1207.
K. W. Nam, C. W. Lee, X. Q. Yang, B. W. Cho, W. S. Yoon and K. B. Kim, J. Power Sources, 2009, 188, 323-331.
S. L. Chou, J. Z. Wang, S. Y. Chew, H. K. Liu and S. X. Dou, Electrochem. Commun., 2008, 10, 1724-1727.
S. W. Lee, J. Kim, S. Chen, P. T. Hammond and Y. Shao-Horn, ACS Nano, 2010, 4, 3889-3896.
R. Amade, E. Jover, B. Caglar, T. Mutlu and E. Bertran, J. Power Sources, 2011, 196, 5779-5783.
H. Zhang, G. Cao, Z. Wang, Y. Yang, Z. Shi and Z. Gu, Nano Lett., 2008, 8, 2664-2668.
M. Pourbaix, Atlas of electrochemical equilibria in aqueous solutions, Pergamon Press, Oxford, 1974.
G. Rayner-Canham and T. Overton, Descriptive inorganic chemistry, Macmillan, 2003.
M. Chigane and M. Ishikawa, J. Electrochem. Soc., 2000, 147, 2246-2251.
M. Chigane, M. Ishikawa and M. Izaki, J. Electrochem. Soc., 2001, 148, D96-D101.
C. Huang, N. P. Young and P. S. Grant, J. Mater. Chem. A, 2014, 2, 11022-11028.
B. E. E. Systems, C. E. T. Systems, S. C. R. R. P. P. N. G. Vehicles, and D. E. P. Sciences, Review of the Research Program of the Partnership for a New Generation of Vehicle.
Y. W. Son, M. L. Cohen and S. G. Louie, Nature, 2006, 444, 347-349.
R. A. Susantyoko, X. Wang, L. Sun, W. Sasangka, E. Fitzgerald and Q. Zhang, Nano Energy, 2015, 12, 521-527.
L. Sun, Y. Fan, X. Wang, R. Agung Susantyoko and Q. Zhang, Nanotechnology, 2014, 25, 255302.
R. A. Susantyoko, X. Wang, Y. Fan, Q. Xiao, E. Fitzgerald, K. L. Pey and Q. Zhang, Thin Solid Films, 2014, 558, 356-364.
X. Wang, L. Sun, R. Agung Susantyoko, Y. Fan and Q. Zhang, Nano Energy, 2014, 8, 71-77.
L. Zhang, K. Jin, L. Wang, Y. Zhang, X. Li and Y. Song, J. Alloy. Compd., 2015, 638, 298-304.
G. Hautier, A. Jain, H. L. Chen, C. Moore, S. P. Ong and G. Ceder, J. Mater. Chem., 2011, 21, 17147-17153.
G. Hautier, C. C. Fischer, A. Jain, T. Mueller and G. Ceder, Chem. Mater., 2010, 22, 3762-3767.
R. Chandrasekaran et al., J. Electromechanical Society, 2010, 157, A1139-A1151.
Y. Yao et al., Nano Letters, 2011, 11, 2949-2954.
N. Liu et al., Nano Letters, Received Apr. 20, 2012.
L. F. Cui et al., Nano Letters, Received Dec. 1, 2008.
A. Gohier et al., Advanced Materials, 2012, 24, 2592-2597.
X. C. Tang et al., Electrochimica Acta, 2009, 54, 2329-2334.
B. Liu et al., Nano Letters, 2012, 12, 3005-3011.
Zhang et al., "The facile synthesis of nickel silicide nanobelts and nanosheets and their application in electrochemical energy storage", Nanotechnology, 19 (2008) pp. 1-7.
Phys.org, "Sweet nanotech batteries: Nanotechnology could solve lithium battery charging problems", (Apr. 10, 2008), Inderscience Publishers.
Non-Final Office Action, U.S. Appl. No. 13/725,969, dated May 11, 2015.
Non-Final Office Action, U.S. Appl. No. 13/935,334, dated Jul. 23, 2015.
Non-Final Office Action, U.S. App. No. 13/868,957, dated Aug. 17, 2015.
Non-Final Office Action, U.S. Appl. No. 13/779,409, dated Aug. 24, 2015.
Non-Final Office Action, U.S. Appl. No. 14/262,497, dated Sep. 22, 2015.
Non-Final Office Action, U.S. Appl. No. 13/779,472, dated Sep. 15, 2015.
Yan, et al., "Preparation and electrochemical properties of composites of carbon nanotubes loaded with Ag and TiO2 nanoparticle for use as anode material in lithium-ion batteries", Electrochimica Acta, vol. 53, No. 22, Sep. 20, 2008, pp. 6351-6355.
Huang, et al., "Electrochemical investigation of TiO2/carbon nanotubes nanocomposite as anode materials for lithium-ion batteries", Materials Letters, vol. 61, No. 1, Jan. 1, 2007, pp. 296-299.
Su, et al., "Advanced titania nanostructures and composites for lithium ion battery", Journal of Materials Science, vol. 47, No. 6, Sep. 29, 2011, pp. 2519-2534.
Extended European Search Report, Application No. 13755702.1, dated Oct. 13, 2015.
Non-Final Office Action, U.S. Appl. No. 13/779,522, dated Oct. 15, 2015.
Non-Final Office Action, U.S. Appl. No. 13/779,571, dated Dec. 3, 2015.
Idota, et al., "Tin-based amorphous oxide: a high-capacity lithium-ion-storage material", Science, vol. 276, May 30, 1997, pp. 1395-1397.
Final Rejection, U.S. Appl. No. 13/725,969, dated Oct. 21, 2015.

(56) References Cited

OTHER PUBLICATIONS

Japanese Office Action, Application No. 2014-209155, dated Dec. 1, 2015 and translation.
Singapore Written Opinion, Application No. 11201405271X, dated Oct. 26, 2015.
Translation of Chinese search report for Chinese Patent Application Ser. No. 2013800205490, dated Feb. 17, 2016.
Ogasawara et al., "Rechageable Li2O2 electrode for lithium batteries", Oct. 2005, J. Am. Chem. Soc., 128, 2006, 1390-1393.
Debart et al., "Alpha-MnO2 nanowires: a catalyst for the O2 electrode in rechargeable lithium batteries", May 2008, Angew. Chem. Int. Ed., 47, 2008, 4521.
Lee et al., "Anomalous growth and characterization of carbon-coated nickel silicide nanowires", Chemical Physics Letters 384 (2004) p. 215-218.
Non Final Office Action, U.S. Appl. No. 14/262,528, dated Apr. 28, 2016.
Non Final Office Action, U.S. Appl. No. 14/176,137, dated May 9, 2016.
U.S. Appl. No. 13/725,969, filed Dec. 21, 2012, Ronald A. Rojeski, Energy Storage Devices.
U.S. Appl. No. 13/779,409, filed Feb. 27, 2013, Ronald A. Rojeski, Hybrid Energy Storage Devices Including Support Filaments.
U.S. Appl. No. 13/779,472, filed Feb. 27, 2013, Ronald A. Rojeski, Hybrid Energy Storage Devices Including Surface Effect Dominant Sites.
U.S. Appl. No. 13/779,522, filed Feb. 27, 2013, Ronald A. Rojeski, Hybrid Energy Storage Device Production.
U.S. Appl. No. 13/779,571, filed Feb. 27, 2013, Ronald A. Rojeski, Hybrid Energy Storage Device Charging.
U.S. Appl. No. 13/935,334, filed Jul. 3, 2013, Ronald A. Rojeski, Lithium-Ion Battery Anode Including Core-Shell Heterostructure of Silicon Coated Vertically Aligned Carbon Nanofibers.
U.S. Appl. No. 14/176,137, filed Feb. 9, 2014, Ronald A. Rojeski, High Capacity Energy Storage.
U.S. Appl. No. 13/868,957, filed Apr. 23, 2013, Ronald A. Rojeski, Hybrid Energy Storage Devices.
U.S. Appl. No. 14/262,497, filed Apr. 25, 2014, Ronald A. Rojeski, Energy Storage Devices.
U.S. Appl. No. 14/262,514, filed Apr. 25, 2014, Ronald A. Rojeski, Hybrid Energy Storage Devices Including Support Filaments.
U.S. Appl. No. 14/262,528, filed Apr. 25, 2014, Ronald A. Rojeski, Energy Storage Devices Including Silicon and Graphite.
Lithium-ion battery, Wikipedia, http://en.wikipedia.org/wiki/Lithium-ion_battery, pp. 1-21.
Synthesis of Vertically Aligned Carbon Nanofiber Films by RF Magnetron Sputtering, Defense Technical Information Center Compilation Part Notice, ADP012146, Symposium Apr. 17-20, 2001, San Francisco, CA., pp. 1-5.
CN200980106188.5, Second Office Action, dated Apr. 22, 2013, pp. 1-9.
KR10-2010-7018725, Preliminary Rejection, dated May 30, 2013, pp. 1-3.
PCT/US2013/028108, Search Report and Written Opinion, dated May 3, 2013, pp. 1-13.
JP2010-547867, Non-Final Office Action, dated Jul. 30, 2013, pp. 1-9.
Christensen, Jake, et al., A Critical Review of Li/Air Batteries, Journal of The Electrochemical Society; 159(2) R1-R30, (2012).
Horstmann, Birger, et al., Rate-dependent morphology of Li2O2 growth in Li—O2 batteries, arXiv:1307.6621v1, [phyusics.chem-ph] (Jul. 25, 2013).
Zhu, Guan-Nan, Ti-based Compounds as Anode Materials for Li-ion Batteries, Energy Environ. Sci., 5, 6652-6667, (2012), 16 pages.
Long, Jeffrey W., Three-Dimensional Battery Architectures, Chem. Rev., 104/4463-4492, (2004), 30 pages.
Klankowski, S. A., et al., Nanostructured Hybrid Li-Ion Anode, J. Mater. Chem. A., 1/1055-1064, (2013), 11 pages.
Arthur, Timothy S., et al., Three-dimensional Electrodes and Battery Architectures, MRS Bulleting, 36/523-531, (Jul. 2011), 9 pages.
PCT/US2013/049382, Rojeski, Ronald A., et al., International Search Report and Written Opinion, dated Oct. 8, 2013, 15 pages.

\* cited by examiner

LITHIUM-ION BATTERY ANODE INCLUDING PRELOADED LITHIUM

CROSS-REFERENCE TO RELATED APPLICATIONS

This application claims benefit of and priority to U.S. provisional application Ser. Nos.
   61/941,205 filed Feb. 18, 2014,
   61/978,161 filed Apr. 10, 2014, and
   62/077,221 filed Nov. 8, 2014; and
is a continuation-in-part of U.S. Non-provisional application Ser. No. 14/176,137 filed Feb. 9, 2014, which in turn claims priority to provisional patent applications:
   61/910,955 filed Dec. 2, 2013,
   61/904,417 filed Nov. 14, 2013,
   61/887,447 filed Oct. 7, 2013,
   61/868,002 filed Aug. 20, 2013, and
   61/806,819 filed Mar. 29, 2013;
and is a continuation in part of U.S. non-provisional application Ser. No. 13/935,334 filed Jul. 3, 2013 which in turn is a continuation-in-part of Ser. No. 13/779,409 filed Feb. 27, 2013 which claimed benefit of U.S. provisional application Ser. Nos. 61/615,179 filed Mar. 23, 2012, 61/752,437 filed Jan. 14, 2013, and which in turn is a continuation in part of Ser. No. 13/725,969 filed Dec. 21, 2012 which in turn claims benefit of provisional applications:
   61/677,317 filed Jul. 30, 2012,
   61/667,876 filed Jul. 3, 2012,
   61/603,833 filed Feb. 27, 2012, and
   61/578,545 filed Dec. 21, 2011;
this application is a continuation in part of U.S. non-provisional application Ser. No. 13/725,969 filed Dec. 21, 2012, which in turn is a continuation-in-part of U.S. non-provisional application Ser. No. 12/904,113 filed Oct. 13, 2010 (issued as U.S. Pat. No. 8,481,214 on Jul. 9, 2013), which in turn claimed benefit of U.S. provisional application Ser. No. 61/254,090 filed Oct. 22, 2009 and is a continuation-in-part of U.S. non-provisional application Ser. No. 12/392,525 filed Feb. 25, 2009 (issued as U.S. Pat. No. 8,420,258 on Apr. 4, 2013), which in turn claimed benefit of U.S. provisional application Ser. No. 61/130,679 filed Jun. 2, 2008 and U.S. provisional application Ser. No. 61/067,018 filed Feb. 25, 2008;
this application is a continuation-in-part of U.S. non provisional application Ser. No. 13/868,957 filed Apr. 23, 2013; and
this application is a continuation-in-part of PCT/US14/11556 filed Jan. 14, 2014.

The disclosures of the above PCT, provisional and non-provisional patent applications are hereby incorporated herein by reference.

BACKGROUND

Field of the Invention

The invention is in the field of energy storage technology.

Related Art

Energy storage is important in many applications. These include, backup power, portable electronic devices, and vehicles. One type of energy storage is the lithium ion battery. This battery is currently used in vehicles and portable electronics. There is, however, a need for improved energy storage capacity.

For example, prior art cathodes used in lithium ion batteries suffer from low energy density (i.e. lithium cobalt oxide ~180 mAh/g) when compared to the best available anode materials (silicon ~4000 mAh/g). To alleviate this issue, there has been focus on developing lithium-air batteries, at the expense of additional complexity of new separators and chemistries to support the battery coming in contact with air. One of the developments is to rely upon the reversible formation/decomposition reaction of $Li_2O_2$ at the cathode upon cycling. [e.g., "A Reversible and Higher-Rate Li—$O_2$ Battery", Science, vol. 337, pgs 563-566]. One issue with the technique described in this paper is that the materials used to catalyze the reaction (gold), has a weight that creates an effective energy density of ~300 mAh/g. The technology also suffers from poor charging rates. The charging rates being dependent at least in part on catalyst surface area.

SUMMARY

Various embodiments of invention disclosed herein include new types of cathodes. These cathodes are optionally used in lithium ion batteries. For example, some embodiments can be used in sealed or un-sealed Lithium-air batteries. These embodiments solve problems with the prior art by provided greater energy storage density per unit mass and per unit volume.

Some embodiments of the invention include an energy storage system comprising an electrode disposed in a first region of electrolyte and including a substrate, a plurality of support filaments attached to the substrate, and an ion absorbing material attached to the support filaments and configured to expand in volume at least 5 percent when absorbing ions; a separator configured to separate the first region and a second region of electrolyte; and a cathode disposed in the second region of electrolyte, the cathode, anode and separator configured to operate as a rechargeable battery.

Some embodiments of the invention include a battery comprising a first cathode electrode comprising a supporting underframe, an active material configured to release oxygen and lithium from the active material in a reduction reaction, the reduction reaction including the reduction of a lithium compound, the active material being disposed on the underframe, and an active catalyzer deposited within the active material, the catalyzer configured to catalyze the reduction reaction; and an anode electrode.

Some embodiments of the invention include battery comprising an anode; a cathode including a conductive substrate, an underframe attached to the substrate, and a catalyst coated on the underframe, the catalyst being configured to catalyze the dissociation of cathode active material; and an electrolyte including the cathode active material.

Some embodiments of the invention include battery comprising: an anode; a cathode including a conductive substrate, an underframe, a catalyst coated on the underframe, the catalyst being configured to catalyze the dissociation of cathode active material, and a binder configured to hold the underframe in proximity to the substrate; and an electrolyte including the cathode active material.

Some embodiments of the invention include battery comprising an anode; a cathode including a conductive substrate, an underframe including an aerogel, and a catalyst disposed within the aerogel, the catalyst being configured to catalyze the dissociation of cathode active material; and an electrolyte including the cathode active material.

Some embodiments of the invention include method of making a battery, the method comprising providing an anode; producing a cathode by growing an underframe including a plurality of nanofibers on a conductive substrate, and depositing a catalyst on the nanofibers, the catalyst being configured to catalyze dissociation of cathode active material; and adding an electrolyte between the anode and the cathode, the electrolyte including the cathode active material.

Some embodiments of the invention include method of making a battery, the method comprising providing an anode; producing a cathode by providing an underframe including plurality of nanofibers, depositing a catalyst on the nanofibers, the catalyst being configured to catalyze dissociation of cathode active material, and applying the nanofibers to a conductive substrate using a binder; and adding an electrolyte between the anode and the cathode, the electrolyte including the cathode active material.

Some embodiments of the invention include a method of making a battery, the method comprising providing an anode; producing a cathode by providing an underframe including an aerogel, depositing a catalyst within the aerogel, the catalyst being configured to catalyze dissociation of cathode active material, and applying the aerogel to a conductive substrate; and adding an electrolyte between the anode and the cathode, the electrolyte including the cathode active material.

DETAILED DESCRIPTION

Figure 1A:
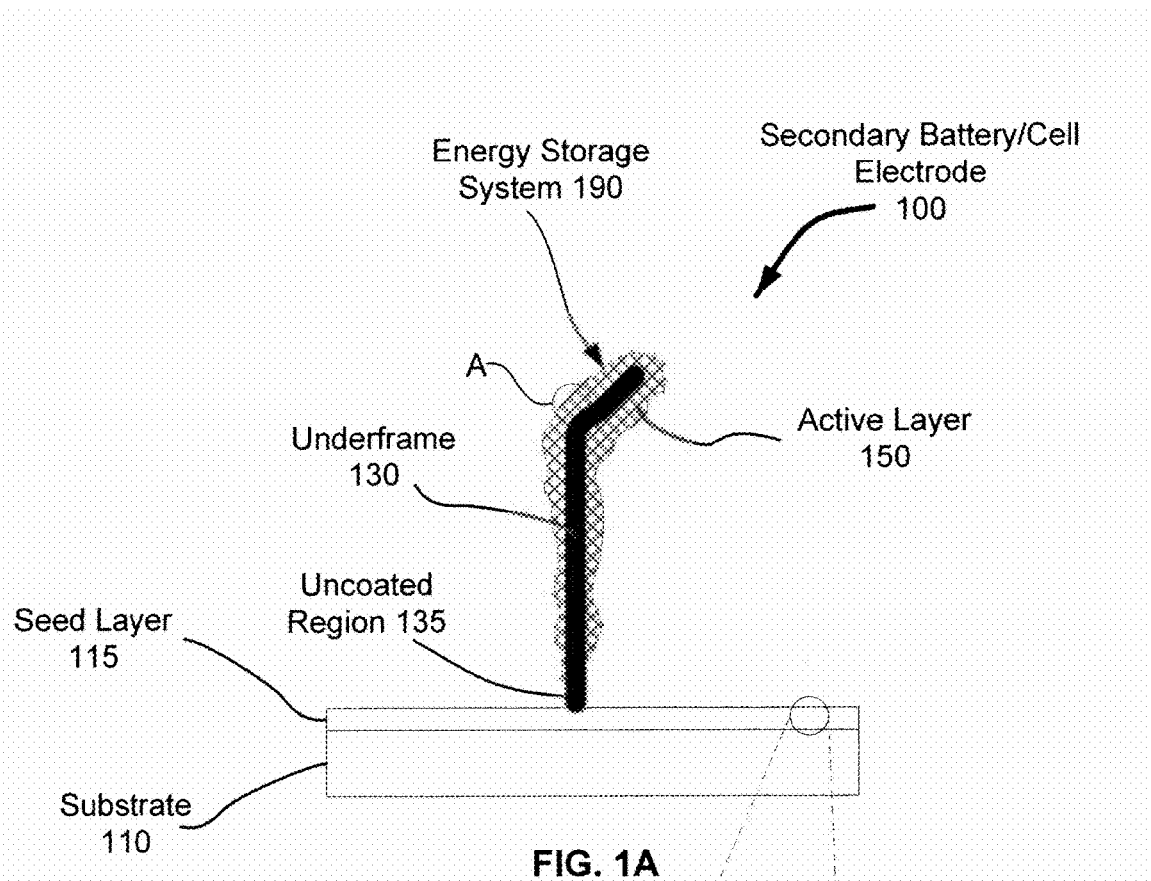
FIG. 1A illustrates a cross section of a single element of an energy storage electrode, according to various embodiments of the invention.

Various embodiments of the invention include a rechargeable (secondary) battery including an improved electrode. The electrode of the invention is optionally included within a part of a cathode and/or an anode of a secondary battery/cell 100 to create an improved battery. The electrode typically includes an electrode extension grown on or attached to a substrate using a seed layer. The electrode extension is configured to increase the surface area of the electrode and includes a support filament and an intercalation layer. In various embodiments, the support filament material includes a carbon nano-tube (CNT), a carbon nano-fiber (CNF), a nano-wire NW (a wire having a diameter less than approximately five micrometer), metal, semiconductor, insulator, silicon, and/or the like. The CNT, CNF, and/or NW may be single walled or multi walled. The support filament may provide an electrical path to the substrate and a mechanical base for the intercalation layer. The intercalation layer provides a region for absorption and/or donation of ions from the electrolyte. As used herein, an intercalation layer can be used at both an anode and a cathode. In various embodiments, the intercalation layer includes a donor/acceptor material (DAM) configured for donating and/or accepting the ions from the electrolyte. This ion donating and/or accepting may include both adsorbing and absorbing processes. The intercalation layer may expand in volume by at least 5, 10, 15, 50, 100, 200 or 400 percent on the absorption of ions.

In various embodiments, the DAM includes silicon, graphite, Sn, Sn—C, intermetallics, phosphides, nitrides, 3D metal oxides, or LiCoPO4, LiMnPO4, LiMn2O4, LiCoO2, LiNiO2, MnO2, vanadium oxides V2O5 and LiV3O8, polyanionic materials such as Li(1-x)VOPO4, Li(x)FePO4), LiMnO2, Li2FePO4F, doped LiMn2O4, and/or the like. The DAM is deposited or grown on the support filament. In some embodiments, the support filament is provided with additional strength (e.g., tensile, compression, shear, and/or the like) for supporting the DAM particularly during expansion and/or contraction of the DAM in the intercalation layer. In some embodiments, the DAM covers part but not all of the support filament. For example, portion of the support filament may remain uncoated. The uncoated portion can provide for flexibility and freedom of movement, for example between the electrode extension and the substrate. In some circumstances this reduces the likelihood of separation of the support filament from the seed layer during expansion and/or contraction of the DAM in the intercalation layer.

The electrode extension increase intercalation volume and surface area, thereby improving energy density of the electrode over a layer of material deposited on a flat surface. The electrode extensions may serve as a flexible interface between the substrate and intercalation layer, thereby allowing a large degree of expansion in volume (e.g., 2×, 4×, 6×, etc.) of the intercalation layer, while at the same time reducing a risk of the material separating from the substrate. The electrode extension can also reduce diffusion distances of the ions in the bulk of the intercalation material, therefore improving power density of the electrode.

FIG. 1A illustrates a cross section of a single element of an energy storage electrode 100, according to various embodiments of the invention. One or more of electrode 100 may be used in a rechargeable battery, such as the rechargeable (secondary) battery of FIG. 6, in accordance with various embodiments of the invention. The electrode 100 includes a substrate 110, an optional seed layer 115, and an energy storage system 190. The energy storage system 190 includes an underframe 130 and an active layer 150 (intercalation layer). The seed layer 115 may be used to initiate growth of the underframe 130 and may be used to facilitate connection of the energy storage system 190 to the substrate 110. In alternative embodiments the energy storage system 190 is coupled directly to the substrate 110. The underframe 110 supports the active layer 150, as well as the optional overlayer 154 and optional underlayer 152. The underframe 130 provides enhanced surface area per unit volume for uptake and/or deposition of additional materials.

The substrate 110 can comprise graphite coated aluminum, graphite, Ni, Ag, Fe, Mg, Pb, W, Al, Hf, Mo, Pd, Ta, Au, In, Nb, Ti, Zr, Cu, Li, Ni, V, Zn, C, carbides of the above elements, silicides of the above elements, oxides of the above elements, nitrides of the above elements, an oxygen permeable membrane, and/or any combination thereof. Note that the substrate can include one material, or a combination of more than one material. (The "above elements" refers to those discussed in this paragraph.) For instance, the substrate 110 can be composed of both aluminum and an oxygen permeable membrane. Additionally, the thickness of the substrate can range in thickness from approximately 5 microns to approximately 250 microns, 250 microns to 750 microns, 750 microns to 2 mm, and 2 mm to 5 mm, or any combination thereof, depending on the particular application of the secondary battery/cell 100.

In various embodiments, the substrate 110 includes an oxygen permeable membrane, polymers, porous materials such as aerogel, metal, a semiconductor, and/or an insulator. The substrate 110 may be fabricated in a variety of shapes. For example, the substrate 110 may be planar (single sided and double sided), cylindrical, finned, and/or the like. In some embodiments, the shape of substrate 110 is selected so as to maximize available surface area. Finally, the electrode 100 typically includes multiple energy storage systems 190, optionally in an array.

The optional seed layer 115 serves one or more of a number of functions and may include several sub-layers. For example, the seed layer 115 may comprise an initial layer 117, an intermediate layer 118, and/or a final layer 119. The seed layer 115 may be configured to control the cross sectional area (e.g., diameter) of the underframe 130 by controlling an area in which initial growth of the underframe 130 occurs. The relative and/or absolute thicknesses of the initial layer 117, an intermediate layer 118, and/or a final layer 119 can be selected to control the area of initial growth of the underframe 130 and thus the underframe cross sectional area (e.g., diameter) shown in FIGS. 2A, 2B, 2C, 2D, & 2E). Those skilled in the art of nanotube, nanofiber, nanowire, and aerogel growth will appreciate that other methods are also available to control the cross sectional area of the underframe 130. In some embodiments, the seed layer 115 may control adhesion of the underframe 130 to the substrate 110. The spacing between adjacent underframe 130 and/or the cross section of the underframe 130 may limit the possible thickness of the active layer 150, over-layer 154, underlayer 152, and vice-versa.

The seed layer 115 may control a density of initiation points and/or an areal density of growth initiation points for the underframe 130. The density of initiation points determines the density of underframe 130 attachment points. The density of attachment points may by between $10^3/cm^2$ to $10^{11}/cm^2$, generally $10^7/cm^2$ to $10^{10}/cm^2$. The initiation density may be expressed as a number of support filament initiation sites per unit area, e.g., number/$cm^2$. The areal density is the density of underframe 130 tips that are distal from seed layer 115 and substrate 110. The areal density can be greater than the density of attachment points because the underframe 130 may be branched, as discussed further elsewhere herein. The areal density may be expressed as a number of support filament tips per unit area, e.g., number/$cm^2$.

In some embodiments, the seed layer 115 is a single material deposited on the substrate 110 in a single layer. Alternatively, the seed layer 115 includes multiple (2, 3 or more) sub-layers of differing materials, e.g., initial layer 117, intermediate layer 118, and/or final layer 119. Each of the sub-layers of the seed layer 115 may be configured to perform various functions. For example, one of the sub-layers may include a barrier layer configured to prevent migration of atoms between layers; include an adhesion layer configured to bind two layers together; a protection layer configured to protect underlying or overlying layers from chemical/physical degradation; a conduction layer configured to provide conductivity; a stress/strain layer configured to act as a mechanical buffer between two layers; a binding/release layer configured to bind/release the final seed material to/from the underlying substrate; a layer configured to inhibit the growth of nanotube, nanofiber, nanowire, and/or aerogels, and/or a seed layer to initiate nanotube, nanofiber, nanowire, and/or aerogel growth. Persons having ordinary skill in the art of thin film growth and deposition will recognize that there are other utilities a thin film layered structure of seed layer 115 can serve.

Figure 1B:
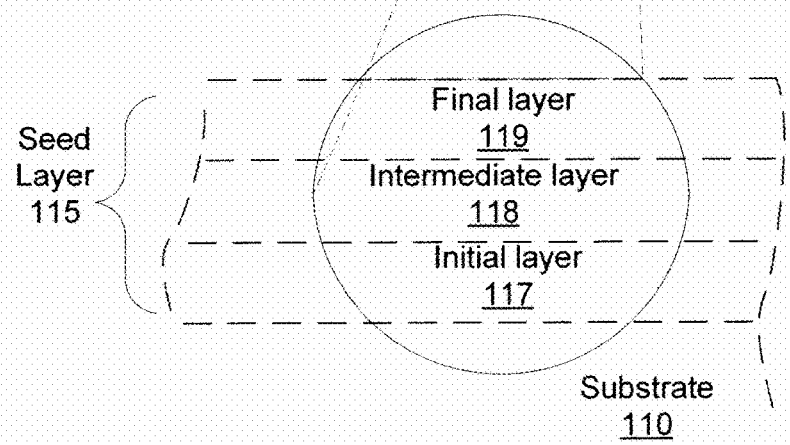
FIG. 1B is a cross section illustrating details of a seed layer of FIG. 1A according to various embodiments of the invention.

FIG. 1B is a cross section illustrating details of the seed layer 115 of FIG. 1A, according to various embodiments of the invention. The seed layer 115 illustrated in FIG. 1B includes a stack of sub-layers comprising different materials. As described elsewhere herein, the sub-layers include, for example, an initial layer 117, an intermediate layer 118 and a final layer 119. The initial layer 117 is coupled to the substrate and forms a base for the intermediate layer 118. The intermediate layer 118 is deposited on the initial layer 117 and configured to form a base for the final layer 119. The final layer 119 is deposited on the intermediate layer 118 and is configured to provide sites for attachment and initiation of growth of the underframe 130. Alternatively, the final layer 119 is configured to inhibit the growth of a nanotube, nanofiber, nanowire, and/or aerogel.

In various embodiments, the final layer 119 includes molybdenum, iron, cobalt, nickel, carbon, graphite, graphene, and/or the like. Various materials in the final layer 119 may initiate or inhibit growth and/or provide for attachment of the including nanotube, nanofiber, nanowire, and/or aerogel. The intermediate layer 118 may comprise, for example, iron, cobalt, nickel, titanium, titanium nitride, aluminum, and/or the like. The initial layer 117 may include, for example, platinum, tungsten, titanium, chromium, and/or the like. It will be appreciated that alternative materials may be included in the sub-layers of seed layer 115.

In various embodiments, the underframe 130 includes nanotube, nanofiber, nanowire, and/or aerogel. More specifically, the nanotube, nanofiber, nanowire, and/or aerogel may comprise materials of metals, carbon, graphene, boron nitride, silicon, $TiO_2$, copper, transition metals, oxides, nitrides, silicides, carbides, $SiO_2$, silica, transition metal oxides, TiN, SiC, TiC, and/or any combination thereof. The nanotubes, nanofibers, nanowires, and/or aerogel may be doped with materials, including, but not limited to boron, phosphor, and/or nitrogen. In some embodiments the underframe 130 includes carbon nanotubes or fibers having a stacked-cup structure. In alternative embodiments, underframe 130 is in the form of a mesh and each of energy storage system 190 need not be attached to substrate 110 and/or seed layer 115 by an end. The stacked-cup structure provides variable surface texture of the underframe 130. This surface variation can result in useful variation and/or structure in any of the layers placed on the underframe 130.

The underframe 130 provides a mechanical base for deposition and growth of the active layer 150, underlayer 152, and overlayer 154. The underframe 130 may also provide strength (e.g., tensile strength, compression strength, shear strength, and/or the like) to the active layer 150. The additional strength reduces or prevents damage to the energy storage system 190 during expansion and/or contraction of the active layer 150. The nanotubes may include a single wall or multiple walls. The nanofibers may include a cup like stacking structure along it's length; the edges of these cups may be described as being 'graphitic' with respect to their material properties i.e. the edges act as graphene sheets. In some embodiments, the nanotube, nanofiber, nanowire, and/or aerogel of the underframe 130 is configured to act as an active material in which material is adsorbed and/or reactions catalyzed. In some embodiments, the nanotube, nanofiber, nanowire, and/or aerogel of the underframe 130 is configured to allow for uptake of additional material, such as gases ($O_2$, $CO_2$, CO, $N_2$, $NO_2$, NO, H2, etc.), nano-particles and/or thin films, such as gold, platinum, MnO, CuFe, beta-$MnO_2$/Pt, Pd, Ru, MoN/NGS, $Li_5FeO_4$, $Li_2MnO_3$*$LiFeO_2$, $FeO_4$, $CoFe_2O_4$, TiN, TiC, $TiO_2$, graphite, Ni, Ag, Fe, Mg, Pb, W, Al, Hf, Mo, Pd, Ta, Au, In, Nb, Ti, Zr, Cu, Li, Ni, V, Zn, C, carbides of the above elements or compounds, silicides of the above elements or compounds, oxides of the above elements or compounds, nitrides of the above elements or compounds, and/or any combination thereof. (The "above elements or compounds" refers to those elements discussed in this paragraph.)

In some embodiments, the active layer 150 does coat some but not all of the length of the underframe 130. As a result, a portion of the underframe 130 forms an uncoated region 135. The uncoated region 135 is configured to provide a region for flex and motion of the underframe 130. This flex can reduce mechanical stress resulting from expansion and contraction of the active layer 150. If not reduced, this stress can cause breakage and/or separation of the underframe 130 from the seed layer 115. Additionally, this uncoated region 135 may provide additional volume for gas, e.g., $O_2$, capture and/or sequestration.

The length of the uncoated region 135 may range from several angstroms to several microns. In some embodiments the length of the uncoated region 135 is selected such that the active layer 150 does not reach or only just reaches the seed layer 115. In various embodiments the length of the uncoated region 135 is at least 0.1, 0.25, 0.3, 0.5, or 1.0 micrometers. In some embodiments, the length of the uncoated region 135 is substantially greater than a micron. In various embodiments the length of the uncoated region 135 is at least 20%, 30%, 40%, 55%, 70%, 85%, 90%, or 95% of the total length of the underframe 130 height. The uncoated region 135 is typically located proximate to the end of underframe 130 closest to the seed layer 115. However, uncoated region 135 may be provided at other or alternative parts of underframe 130. For example, uncoated region 135 may be provided proximate to branches within underframe 130.

In some embodiments, uncoated region 135 is a region that has reduced coating of active layer 150 relative to other parts of energy storage system 190, rather than a region having no coat at all. For example, uncoated region 135 may have a coating of active layer 150 whose thickness is less than 10, 25 or 50% of the thickness of the active layer 150 found in other regions of energy storage system 190.

Figure 1C:
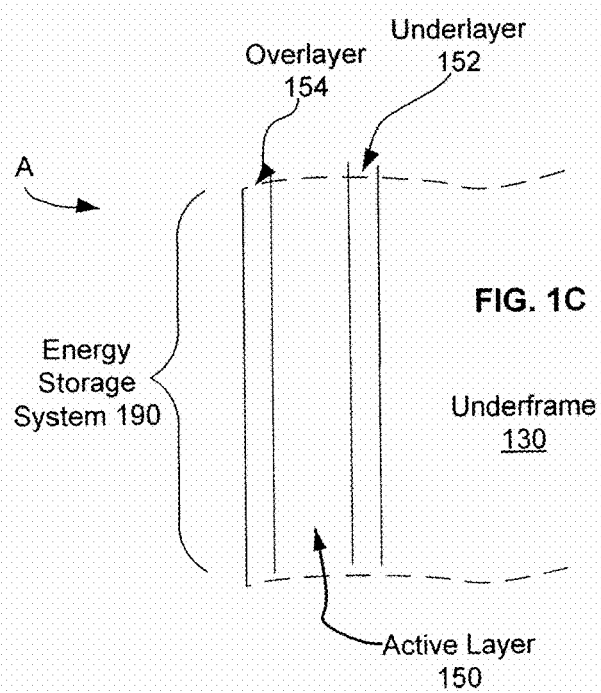
FIG. 1C is a cross section of a portion of the energy storage electrode of FIG. 1A illustrating an underlayer between an underframe and active layer, and an over-layer that optionally encapsulates the active layer, according to various embodiments of the invention.

FIG. 1C is a cross section of a portion of the energy storage system 190 of FIG. 1A, according to various embodiments. An exemplary location of this cross section is shown by label "A" in FIG. 1A. In these embodiments, energy storage system 190 includes an optional underlayer 152 between the underframe 130 and the active layer 150, and an optional overlayer 154. Overlayer 154 optionally encapsulates the active layer 150, forming a barrier between active layer 150 and an electrolyte. The electrolyte includes an active material configured to react in an electrochemical reaction at the cathode (a cathode active material). The cathode active material may include, for example, lithium ion or some other cation.

In some embodiments, the underlayer 152 is configured to provide a seed layer for vapor-liquid-solid (VLS) growth of the active layer 150. Alternatively, the underlayer 152 includes a thin layer (e.g., less than one micrometer) of a metal or a series of metals (e.g., a transition metal, gold, silver, copper, nickel, and/or the like) or a salt (e.g., LiF). Underlayer 152 optionally includes a suicide. Other materials may be used to form an underlayer 152 depending on the desired effect. For instance, the underlayer 152 can be composed of a thin film or particulate layer with thicknesses that ranges from about 1 nm to 5 nm, 3 nm to 7 nm, 5 nm to 12 nm, 10 nm to 17 nm, 13 nm to 25 nm, 20 nm to 47 nm, 29 nm to 53 nm, 37 nm to 71 nm, 57 nm to 101 nm, or any combination thereof. This thin film or particulate layer may have a material composition comprising gold, platinum, $MnO_x$ CuFe, beta-$MnO_2$/Pt, Pd, Ru, MoN/NGS, $Li_5FeO_4$, $Li_2MnO_3$*$LiFeO_2$, $FeO_4$, $CoFe_2O_4$, TiN, TiC, $TiO_2$, and/or any combination thereof. Additionally, underlayer 152 can be comprised of nanoparticles with average diameters of 1 nm, 3 nm, 5 nm, 8 nm, 13 nm, 17 nm, 23 nm, 29 nm, 37 nm, 43 nm, 53 nm, 61 nm, 67 nm, 79 nm, 97 nm, 115 nm, possibly larger, or any range there between. Underlayer 152 is optionally comprised of both thin films and nanoparticles. Underlayer 152 can also be partially comprised of gel electrolyes, such as P(VDF-HFP)-based polymer electrolytes, poly acrylic acid, and polyfluorene-based conducting polymers, incorporating a carbon-oxygen functional group (carbonyl). In this case the thickness of the underlayer 152 can be as much as 500 nm, 750 nm, 900 nm, 1200 nm, or possibly more.

The overlayer 154 may be grown and/or deposited on the active layer 150. The over-layer 154 may partially or fully encapsulate the active layer 150. The materials that comprise the over-layer 154 include, for example, metals such as gold, silver, copper, and/or the like. The over-layer 154 can also include a diamond-like coating (DLC), or an insulator, such as $SiO_2$, a binder, a polymer, and/or the like. The thickness of the over-layer 154 is typically less than one micrometer in the case of metals, semiconductors or insulators. In various embodiments, the thickness of the over-layer 154 may be larger than a micrometer for a binder or larger for polymers. For instance, the over-layer 154 can be composed of a thin film with thicknesses that range from about 1 nm to 5 nm, 3 nm to 7 nm, 5 nm to 12 nm, 10 nm to 17 nm, 13 nm to 25 nm, 20 nm to 47 nm, 29 nm to 53 nm, 37 nm to 71 m, 57 nm to 101 nm, or an combination thereof. This thin film may have a material composition comprising of gold, platinum, MnO, CuFe, beta-MnO$_2$/Pt, Pd, Ru, MoN/NGS, Li$_5$FeO$_4$, Li$_2$MnO$_3$*LiFeO$_2$, FeO$_4$, CoFe$_2$O$_4$, TiN, TiC, TiO$_2$, and/or any combination thereof. Additionally or alternatively, overlayer 154 can be comprised of nanoparticles with average diameters of up to 1 nm, 3 nm, 5 nm, 8 nm, 13 nm, 17 nm, 23 nm, 29 nm, 37 nm, 43 nm, 53 nm, 61 m, 67 nm, 79 nm, 97 nm, 115 nm, possibly larger, or any range there between. These particles may have a material composition comprising gold, platinum, MnO, CuFe, beta-MnO$_2$/ Pt, Pd, Ru, MoN/NGS, Li$_5$FeO$_4$, Li$_2$MnO$_3$*LiFeO$_2$, FeO$_4$, CoFe$_2$O$_4$, TiN, TiC, TiO$_2$, and/or any combination thereof. Overlayer 154 is optionally comprised of both thin films and nanoparticles. Overlayer 154 can also be partially comprised of gel electrolyes, such as P(VDF-HFP)-based polymer electrolytes, poly acrylic acid, and polyfluorene-based conducting polymers, incorporating a carbon-oxygen functional group (carbonyl). In this case the thickness of the overlayer 154 can be up to 500 nm, 750 nm, 900 nm, 1200 nm, or possibly more.

The active layer 150 may be grown/deposited on the underframe 130 using a various methods. These methods include, for example, evaporation, sputtering, PECVD (Plasma-Enhanced Chemical Vapor Deposition), low-pressure chemical vapor deposition (LPCVD), VLS (Vapor Liquid Solid synthesis), electroplating, electro-less deposition, "field-free" chemical vapor deposition (CVD), metal-organic CVD, molecular beam epitaxy (MBE), and/or the like. In some embodiments, the active layer 150 distribution over the surface of the underframe 130 is uniform. Alternatively, the active layer 150 thickness is not uniform over the length of the underframe 130. For example, the uncoated region 135 height may vary from 0% to 99% of the height of the underframe 130. In some embodiments, the active layer 150 proximate to the substrate 110 has a smaller thickness relative to the distal end of the underframe 130. As such, the thickness of the active layer 150 may increase, along underframe 130, with distance from the substrate 110.

The active layer 150 is optionally comprised of Li$_2$O$_2$, Li$_2$O, lithiated TiS$_2$, LiOH*H$_2$O, LiOH, (LiMO$_2$, M=Mn, Ni, Co), LiFePO$_4$, lithiated TiO$_2$, and/or any combination thereof. In various embodiments, the thickness of the active layer is from 1-10 nm, 5-50 nm, 15-75 nm, 25-100 nm, 50-200 nm, 80-350 nm, 120-600 nm, 175-950 nm, 250-1500 nm, 425-2500 nm, 725-4000 nm, any combination thereof, or possibly larger. Nanoparticles are optionally interspersed within the active layer 150. These nanoparticles are comprised of, for example, gold, platinum, MnO$_x$, CuFe, beta-MnO$_2$/Pt, Pd, Ru, MoN/NGS, Li$_5$FeO$_4$, Li$_2$MnO$_3$*LiFeO$_2$, FeO$_4$, CoFe$_2$O$_4$, TiN, TiC, TiO$_2$, or any combination thereof. These nanoparticles may have diameters between 1 nm, 3 nm, 5 nm, 8 nm, 13 nm, 17 nm, 23 nm, 29 nm, 37 nm, 43 nm, 53 nm, 61 m, 67 nm, 79 nm, 97 nm, 115 nm, possibly larger, or any combination thereof. Additionally, the active layer 150 may be partially comprised of gel electrolyes, such as P(VDF-HFP)-based polymer electrolytes, poly acrylic acid, and polyfluorene-based conducting polymers, incorporating a carbon-oxygen functional group (carbonyl).

A number of methods may be employed to achieve a desired length for the uncoated region 135. Examples of such methods include controlling the aspect ratio of the underframe 130 during growth, directional deposition, electro-deposition, electro-less deposition at the bottom layer to isolate the trunk, sputter and light etch of a masking layer to open the underframe 130 to active layer 150 growth/deposition, pre-coupling layer isolation (i.e. mask seed locations) prior to growth of the underframe 130, modifying growth parameters of the underframe 130 to achieve an advantageous aspect ratio (such as a tree like structure), or performing a deposition and directional etch back to free the under-frame 130 from coverage by active layer 150.

FIGS. 2A-2E illustrate various examples of individual nanotubes, nanofibers, nanowires and aerogel in an array. The array is optionally a vertically aligned array. For clarity, the individual nanotubes, nanofibers, nanowires and aerogel are shown without the overlaying active layer 150 etc. that is included on these elements to form Energy Storage System 190, as illustrated in FIGS. 1A-1C. As used herein, the term underframe is used to refer to a single structural element (e.g., a signal support filament including a nanotube, nanofiber, nanowire, or aerogel) and also to an array thereof. In some embodiments, underframe 130 includes a mixture of nanotubes, nanowires and/or aerogel.

Figure 2A:
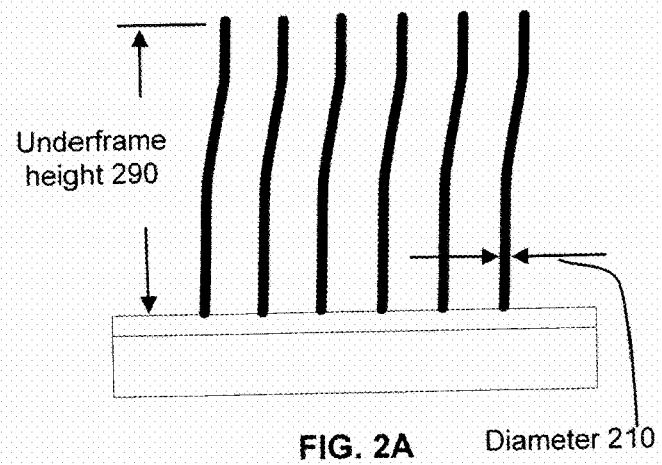
FIG. 2A illustrates an underframe including a vertically aligned array of nanotubes or nanowires, according to various embodiments of the invention.

FIG. 2A illustrates an underframe 130 of vertically aligned arrays of nanotubes or nanowires. In various embodiments, the diameter 210 of an individual nanotube, nanofiber, or nanowire is less than 10 nm, between 10 nm and 50 nm, between 20 nm and 80 nm, between 40 nm and 120 nm, between 80 nm and 300 nm, between 120 nm and 450 nm, between 255 and 710 nm, between 380 nm and 1050 nm, and greater the 900 nm, or any combination thereof. The diameter 210 can vary along the length (height) of the an individual nanotube, nanofiber, or nanowire. Note that the diameters of the individual nanotubes, nanofibers, or nanowires need not be the same for all elements of the vertically aligned array. The variation in diameters can be up to 0.1%, 0.25%, 2%, 5%, 10%, 25%, or possibly greater. In various embodiments, the underframe height 290 of the array is an average height and is about 1 micron to 5 microns, 2 microns to 10 microns, 4 microns to 20 microns, 7 microns to 31 microns, 17 microns to 57 microns, 31 microns to 123 microns, 43 microns to 253 microns, 79 microns to 623 microns, 258 microns to 1289 microns, possibly larger, or any combination thereof. This height may vary as the array of nanotubes, nanofibers, or nanowires tilts or bends. Height variation of the individual nanotubes, nanofibers, or nanowires may also be present.

Figure 2B:
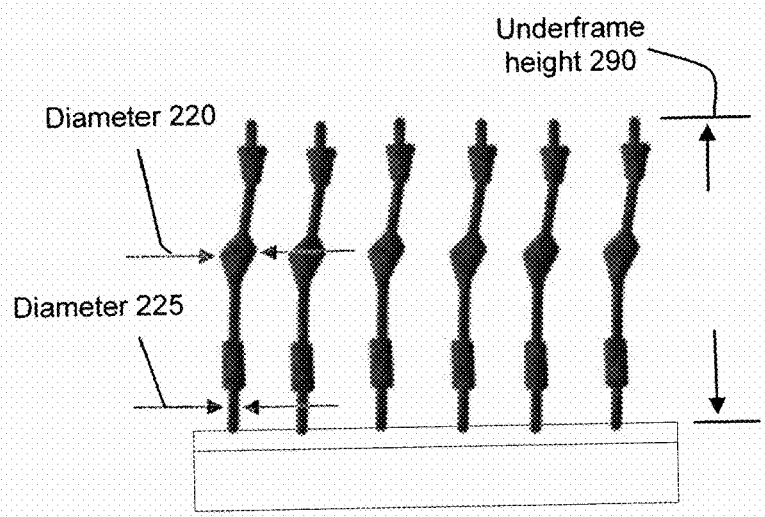
FIG. 2B illustrates an underframe including a vertically aligned array of nanotubes or nanowires, including diameter variation along the length of the nanotubes or nanowires, according to various embodiments of the invention.

FIG. 2B illustrates an underframe 130 of vertically aligned arrays of nanotubes, nanofibers, or nanowires, with diameter variation along the length of the nanotube, nanofibers, or nanowire. In various embodiments, the diameter 225 is less than 10 nm, between 10 nm and 50 nm, between 20 nm and 80 nm, between 40 nm and 120 nm, between 80 nm and 300 nm, between 120 nm and 450 nm, between 255 and 710 nm, between 380 nm and 1050 nm, and greater the 900 nm, or any combination thereof. The diameter 225 can vary along the length (height) of the individual nanotube, nanofiber, or nanowire. Note that the diameters of the individual nanotubes, nanofibers, or nanowires need not be the same for all elements of the vertically aligned array. The variation in diameters can be up to 0.1%, 0.25%, 2%, 5%, 10%, 25%, or possibly greater. Additionally, by way of example, the diameter 220 can vary as different cross-sectional shapes, such as a oval, tear drop, rectangle, diamond, or trapezoid. Other cross sectional shapes are possible. In some embodiments the diameter 220 varies as a result of a stacked-cup structure of individual nanotubes, nanofibers, or nanowires. This structure is discussed further elsewhere herein.

Figure 2C:
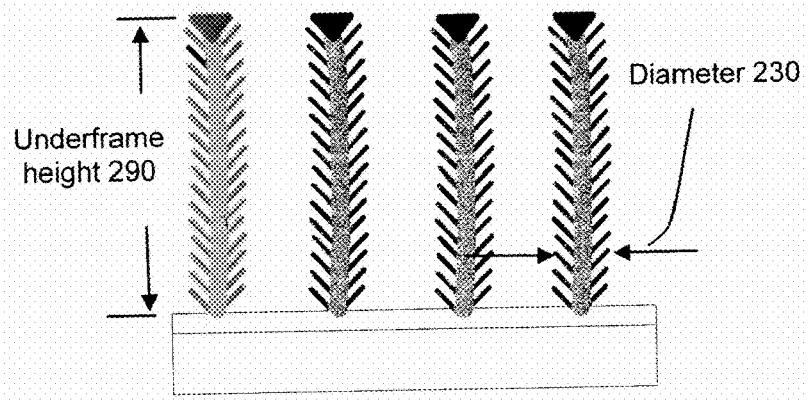
FIG. 2C illustrates an underframe including a vertically aligned array of nanofibers, with 'graphitic' edges exposed, according to various embodiments of the invention.

FIG. 2C illustrates an under-frame 130 of vertically aligned arrays of nanofibers, with 'graphitic' edges exposed. This occurs in, for example, the stacked-cup structure of some carbon nanofibers. In various embodiments, the diameter 230 is less than 10 nm, between 10 nm and 50 nm, between 20 nm and 80 nm, between 40 nm and 120 nm, between 80 nm and 300 nm, between 120 nm and 450 nm, between 255 and 710 nm, between 380 nm and 1050 nm, greater the 900 nm, or any combination thereof. The diameter 230 can vary along the length (height) of an individual nanotube, nanofiber, or nanowire. Note that the diameters of the individual nanotube, nanofiber, or nanowire need not be the same for all elements of the vertically aligned array. The variation in diameters 230 can be up to 0.1%, 0.25%, 2%, 5%, 10%, 25%, or possibly greater.

Figure 2D:
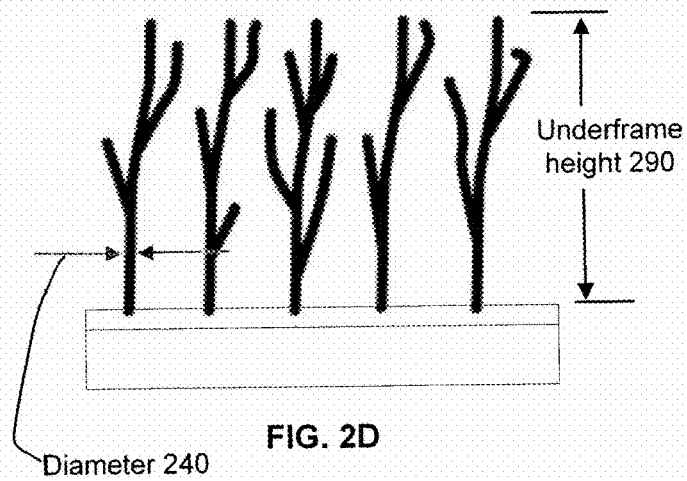
FIG. 2D illustrates an underframe including a vertically aligned array of branched nanotubes, branched nanofibers, or branched nanowires, according to various embodiments of the invention.

FIG. 2D illustrates an under-frame 130 of vertically aligned arrays of nanotubes, nanofibers, or nanowires including branches. In various embodiments, the diameter 240 and underframe height 290 include characteristics and ranges similar to those discussed above with respect to FIGS. 2A-2C (e.g., diameter 210, diameter 225, and diameter 230).

Figure 2E:
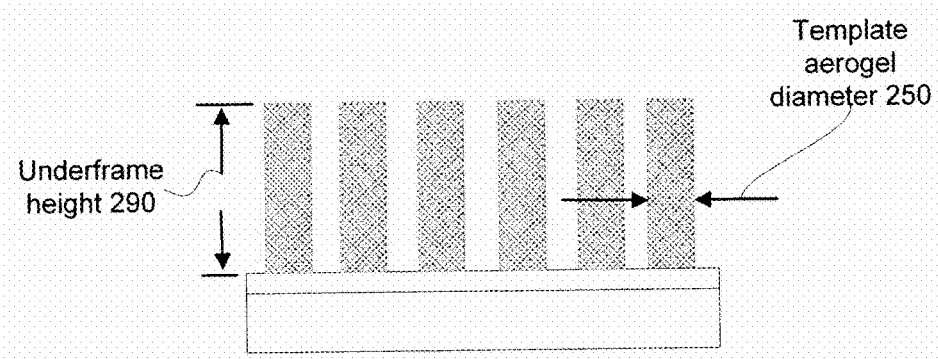
FIG. 2E illustrates an underframe including a template formed aerogel, according to various embodiments of the invention.

FIG. 2E illustrates an under-frame 130 of template formed aerogel. The aerogel can be a continuous layer or in an array as illustrated. In some embodiments, the aerogel is formed without the use of a template. In some embodiments the aerogel is mixed with the nanotube, nanofiber, or nanowire structures illustrated in FIGS. 2A-2D. In these embodiments the aerogel can be disposed in an array between the individual nanotubes, nanofibers, or nanowires, or may be deposited on the an individual nanotubes, nanofibers, or nanowires.

In various embodiments, the template aerogel diameter 250 is less than 10 nm, between 10 nm and 50 nm, between 20 nm and 80 nm, between 40 nm and 120 nm, between 80 nm and 300 nm, between 120 nm and 450 nm, between 255 and 710 nm, between 380 nm and 1050 nm, 510 nm and 2300 nm, 1550 nm and 4700 nm, 3380 nm and 7450 nm, 6680 nm and 15500 nm, 9870 nm and 23500 nm, and greater the 50000 nm. The template aerogel diameter 250 can vary along the length (height) of the aerogel and/or between members of the array. The variation in diameters can be up to 0.1%, 0.25%, 2%, 5%, 10%, 25%, or possibly greater.

Figure 3:
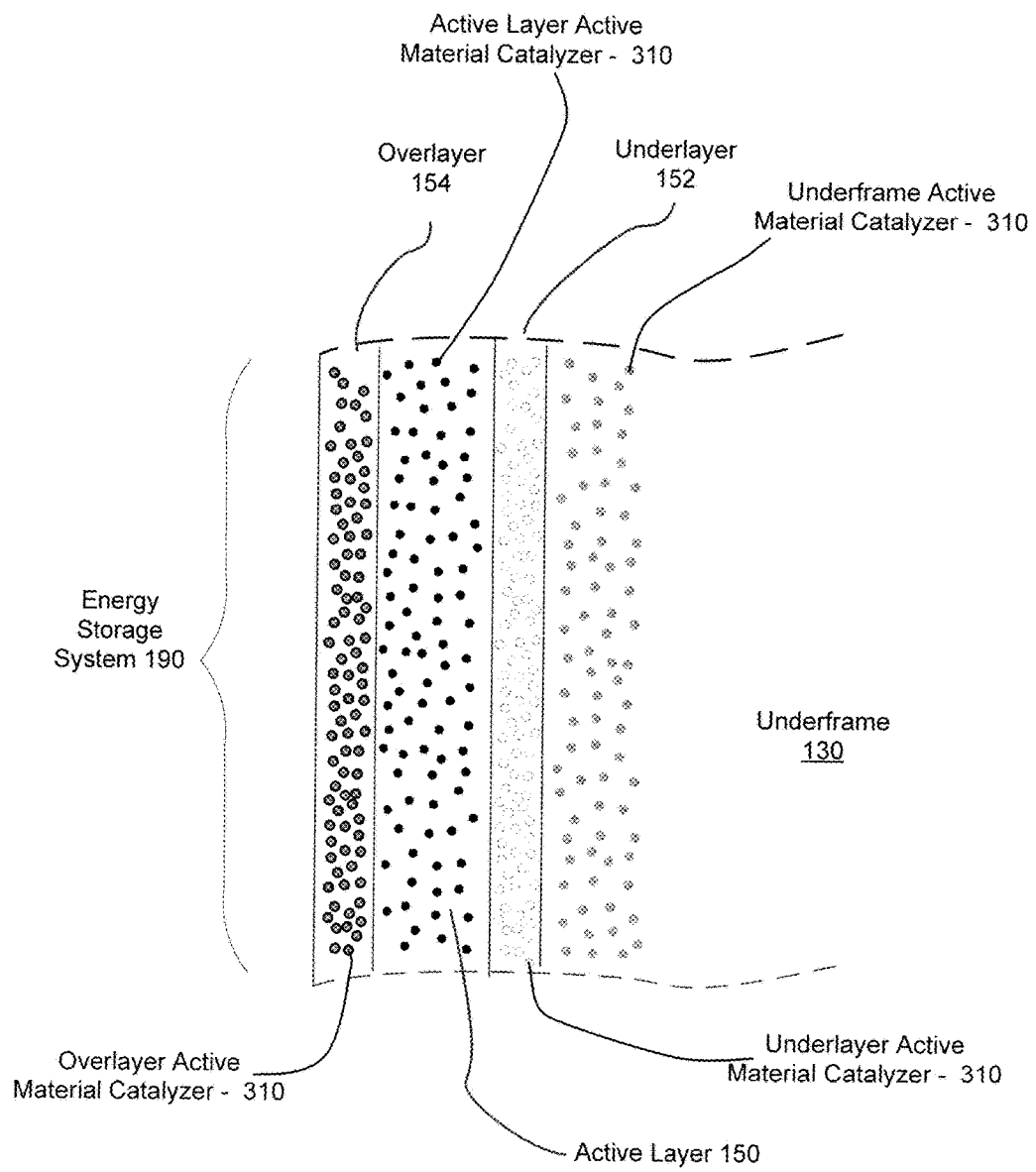
FIG. 3 illustrates further details of a cross section of a portion of the energy storage electrode of FIG. 1A, according to various embodiments of the invention.

FIG. 3 illustrates further details of a cross section of a portion, illustrated in FIG. 1C, of the energy storage system 190, according to various embodiments of the invention. These embodiments include active material catalyzers 310 (AMC). Active material catalyzers 310 are an example of surface effect dominant sites but optionally or alternatively serve to catalyze electrical chemical reactions. Surface effect dominant sites include surfaces of a nanoparticle configured to adsorb charge carriers in a faradaic interaction, e.g., to undergo redox reactions with charge carriers. They are referred to as "surface effect dominant" because optionally, for these nanoparticles, the faradaic interaction between the charge carriers and the nanoparticle surfaces dominate bulk faradaic interactions. Thus, the charge carriers may be more likely to react at the surface relative to the bulk of the nanoparticles. For example, a lithium ion could more likely adsorb onto the surface of the nanoparticle rather than being absorbed or plate into the bulk of the nanoparticle. These nanoparticles are sometimes referred to as surface redox particles. The faradaic interaction results in a pseudo capacitor that can store a significant amount of loosely bound charge and thus provide a significant power density to an energy storage device. In pseudo capacitance an electron is exchanged (e.g., donated). In this case between the charge carrier to the nanoparticle. While some potentials would result in some intercalation of charge carrier into the nanoparticle, this does not necessarily constitute the bulk of the interaction at Surface Effect Dominant Sites and can degrade some types of nanoparticles. A faradaic interaction is an interaction in which a charge is transferred (e.g., donated) as a result of an electrochemical interaction. AMCs 310 are not surface effect dominant sites in some embodiments.

However, optionally active material catalyzers 310 are typically more than just surface effect dominant sites. In some embodiments, active material catalyzers 310 are configured to catalyze electro-chemical reactions. For example, in some embodiments active material catalyzers 310 are configured to release oxygen from a compound including lithium and oxygen. In some embodiments the catalyzers 310 are configured to catalyze $Li^+ + \frac{1}{2}O_2 + e^- \leftarrow\rightarrow \frac{1}{2}Li_2O_2$ and/or $Li^+ + \frac{1}{4}O_2 + e^- \leftarrow\rightarrow \frac{1}{2}Li_2O$, or any other reactions known in the art of lithium based batteries. The interactions that occur at active material catalyzers 310 may be dependent on the potentials applied.

Active material catalyzers 310 can be implemented as nanoparticles and/or thin films. Active materials catalyzers 310 are generally comprised of materials such as gold, platinum, MnO, CuFe, beta-$MnO_2$/Pt, Pd, Ru, MoN/NGS, $Li_5FeO_4$, $Li_2MnO$ $LiFeO_2$, $FeO_4$, $CoFe_2O_4$, TIN, TIC, $TiO_2$, and/or any combination thereof.

As nanoparticles, active material catalyzers 310 can have average diameters of up to 1 nm, 3 nm, 5 nm, 8 nm, 13 nm, 17 nm, 23 nm, 29 nm, 37 nm, 43 nm, 53 nm, 61 nm, 67 nm, 79 nm, 97 nm, 115 nm, possibly larger, and/or any combination thereof. Note that the nanoparticles can have multiple sizes, therefore implying a distribution of particle size. This distribution is not necessarily a normal distribution, e.g., the distribution may be bimodal. These nanoparticles can be found as part of the underframe 130, underlayer 152, active layer 150, and/or overlayer 154.

Thin film AMCs 310 have an average thickness range from about 1 nm to 5 nm, 3 nm to 7 nm, 5 nm to 12 nm, 10 nm to 17 nm, 13 nm to 25 nm, 20 nm to 47 nm, 29 nm to 53 nm, 37 nm to 71 m, 57 nm to 101 nm, possibly larger, or any combination thereof. Thin film AMCs 310 can be part of the underlayer 152 and/or the overlayer 154. The active layer 150 is optionally comprised of $Li_2O_2$, $Li_2O$, lithiated $TiS_2$, $LiOH*H_2O$, LiOH, ($LiMO_2$, M=Mn, Ni, Co), $LiFePO_4$, $TiO_2$, lithiated $TiO_2$, and/or any combination thereof. In various embodiments, the thickness of the active layer is from 1-10 nm, 5-50 nm, 15-75 nm, 25-100 nm, 50-200 nm, 80-350 nm, 120-600 nm, 175-950 nm, 250-1500 nm, 425-2500 nm, 725-4000 nm, possibly larger, or any combination thereof.

Note that while the distribution of AMCs 310 within each layer of FIG. 3 are shown to be relatively uniform, in alternative embodiments the AMCs 310 are concentrated at one or the other edge of any of the layers, and/or may be concentrated at a boundary between any two of the layers illustrated. For example, in some embodiments AMCs 310 are concentrated around the boundary between Overlayer 154 and Active Layer 150, and/or at the boundary between Active Layer 150 and Underlayer 152. Such concentrations can be achieved, for example, by depositing the AMCs between steps of generating any two of the illustrated layers and/or underframe 130. AMCs 310 may be disposed as a gradient within any of the layers illustrated. In some embodiments, AMCs 310 include oxygen adsorbing materials.

Figure 4:
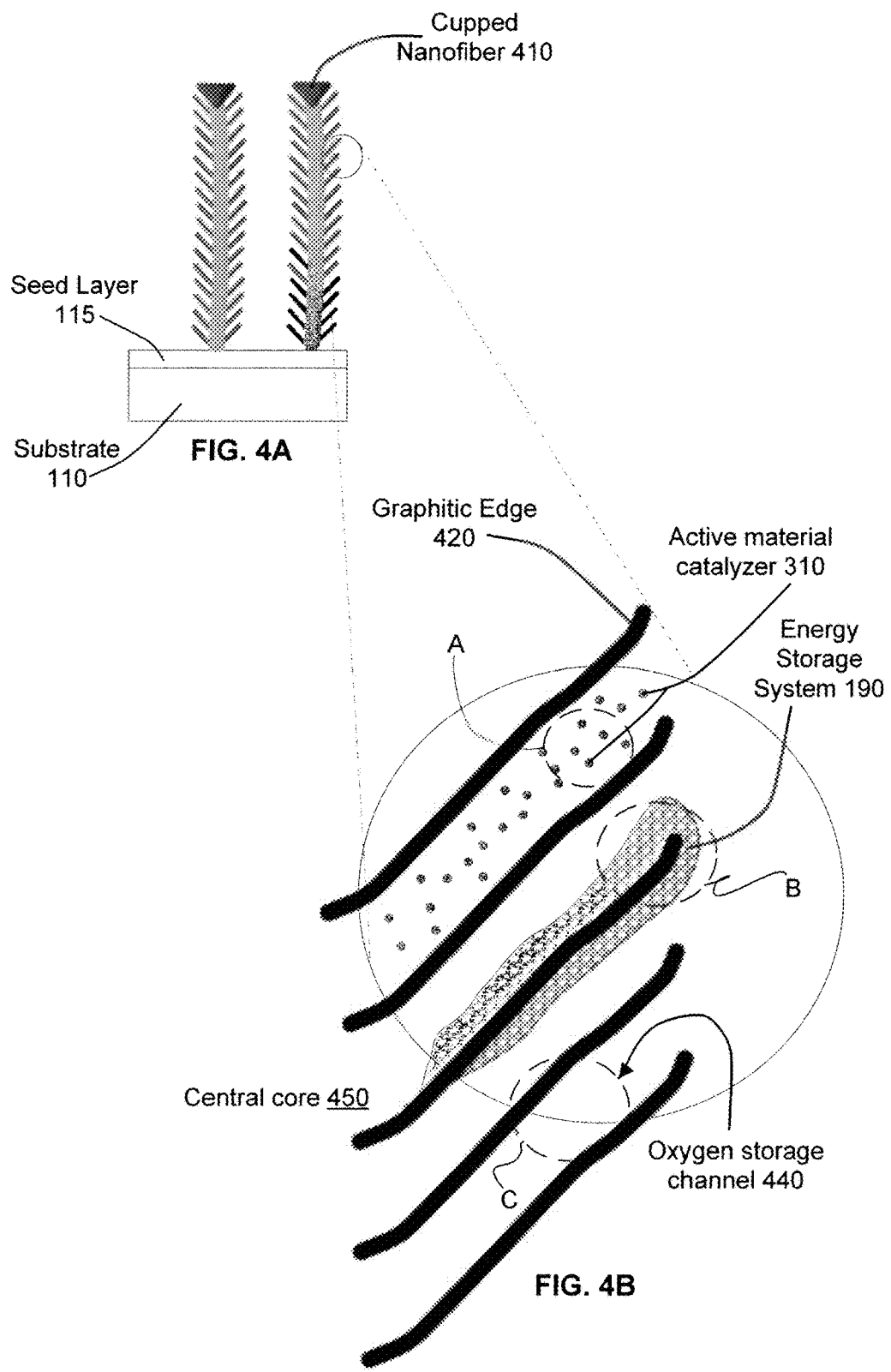
FIG. 4A illustrates a cross section of several elements of an energy storage electrode with stacked-cup nanofibers, according to various embodiments of the invention.
FIG. 4B illustrates a cross section of several elements of a stacked-cup nanofiber with exposed 'graphitic' edges, according to various embodiments of the invention.

FIG. 4A illustrates a cross section of several elements of an energy storage electrode with stacked-cup nanofibers, according to various embodiments of the invention. Specifically, stacked-cup nanofibers have exposed graphitic edges and planes that act as graphene sheets. These graphene sheets wrap around a central 'core'. These sheets layer on top of each other, creating increased surface area relative to standard nanotubes (which typically have a smooth surface). Additionally, the stacked sheets create channels to the central core of the cupped nanofiber 410. These stacked-cup nanofibers can be in a vertically aligned array as illustrated in FIG. 2C or separated from the surface on which they were grown and attached as a mesh to a new substrate using a binder. Further examples of the stacked-cup structure are illustrated in FIGS. 3A-3C and 4 of U.S. patent application Ser. No. 13/935,334 filed Jul. 3, 2013.

FIG. 4B illustrates a detailed cross section of several elements ("cup edges") of a stacked-cup nanofiber with exposed 'graphitic' edges, according to various embodiments of the invention. In particular, the exposed graphitic edge sheets allow for incursion of particulate active material catalyzer 310 including the materials and characteristics discussed elsewhere herein, between the graphitic edges. See region "A" in FIG. 4B.

Optionally, an element of energy storage system 190 can be created, with all the attributes as listed and shown in FIG. 3, on each exposed graphite edge of stacked-cup nanofiber. See region "B" in FIG. 4B. An additional attribute of the stacked-cup nanofiber structure is the existence of a gas storage channel for gas sequestration. See region "C" in FIG. 4B. This channel optionally provides a path for gasses to reach a hollow central core within the nanofiber. Such gasses can include $O_2$, $CO_2$, CO, $N_2$, $NO_2$, NO, $H_2$, etc. By way of example, in some embodiments, an oxygen absorber (not shown) such as strontium cobaltite, is included in the channel 440 between the exposed (graphene like) stacked-cup edges to capture excess oxygen. Other materials can optionally be used to capture and release other gases. Absorbers of the above gasses may also be included within the hollow central core 450 of a stacked-cup nanofiber or an unzipped nanotube.

The various features illustrated in regions "A," "B" and "C" of FIG. 4 may be including in stacked-cup nanofibers in any combination. For example, one embodiment includes the particulate active material catalyzer 310 illustrated in region "A," the active layer 150 included in region "B," and room for oxygen sequestration illustrated in region "C." These are optionally included within the same channel 440.

Figure 5:
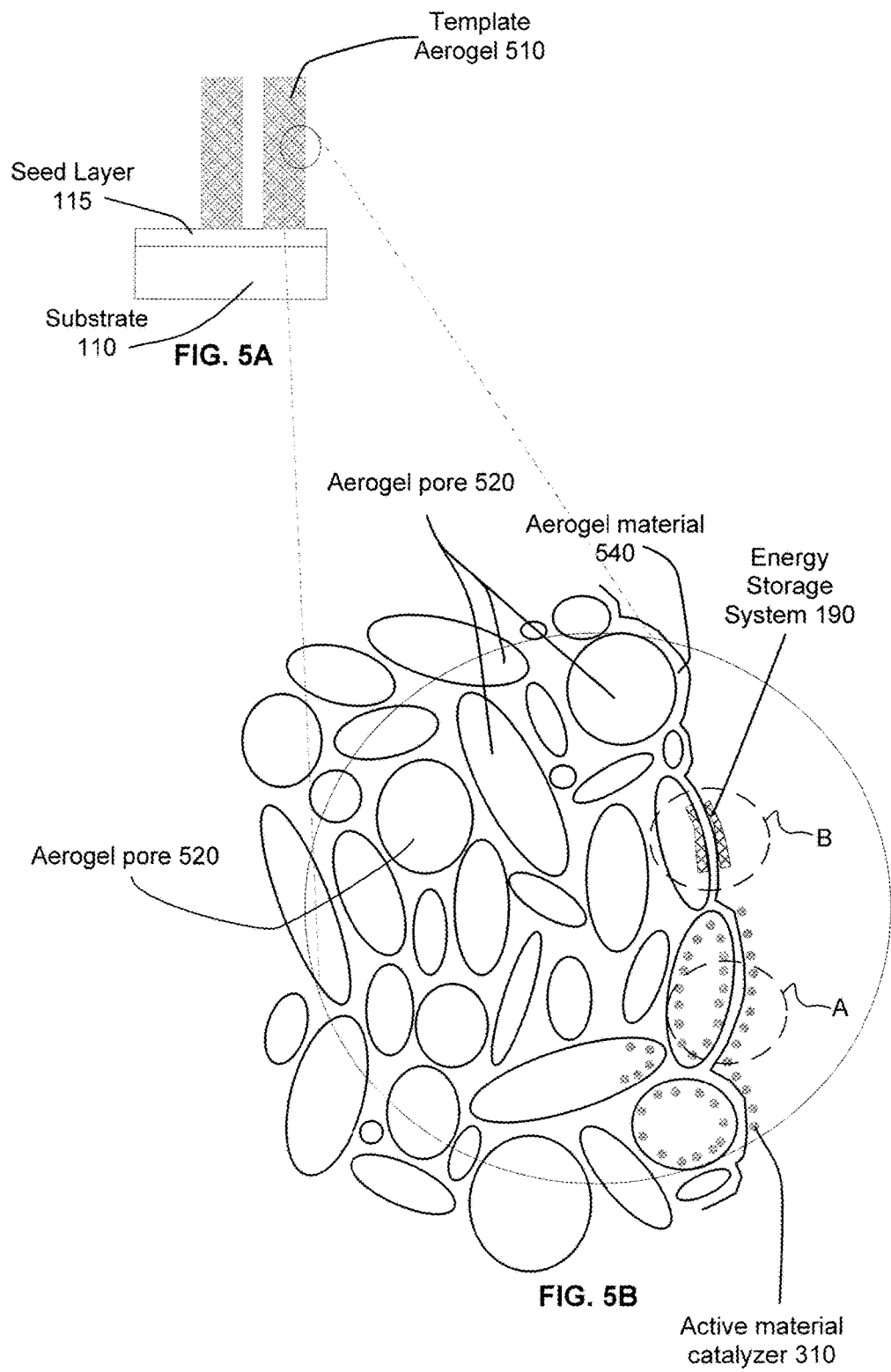
FIG. 5A illustrates a cross section of several elements of an energy storage electrode including a template formed aerogel, according to various embodiments of the invention.
FIG. 5B illustrates a cross section of an aerogel, according to various embodiments of the invention.

FIG. 5A illustrates a cross section of several elements of an energy storage electrode including a template formed aerogel, according to various embodiments of the invention. Specifically, the aerogel has an average density that ranges from about 0.008 $g/cm^3$ to 0.3 $g/cm^3$, a surface area that ranges from about 200 $m^2/g$ to 2000 $m^2/g$, a pore volume that ranges from about 0.5 $cm^3/g$ to 25 $cm^3/g$, and an average pore diameter that ranges from about 2 nm to 50 nm.

FIG. 5B illustrates a cross section of an aerogel 510, according to various embodiments of the invention. In some embodiments, exposed aerogel pores 520 and resulting large surface area allow for incursion of active material catalyzer 310 within the aerogel. An example is illustrated in region "A" of FIG. 5B.

In some embodiments, an energy storage system 190 (with or without active material catalyzer 310) can be created on surfaces of the aerogel. These embodiments of energy storage system 190 can include any or all the attributes and characteristics discussed elsewhere herein. An example of energy storage system 190 is illustrated in region "A" of FIG. 5B. This example can be included on any or all of the available surfaces of the aerogel 510. The surfaces and boundaries between the pores function as the underframe 130. The active material catalyzer 310 shown in region "A" and the energy storage system 190 shown in region "B" are optionally found together, e.g., the active material catalyzer 310 can be included in the energy storage system 190 as discussed elsewhere herein.

An additional attribute of the aerogel is the presence of a gas storage channels for gas sequestration. Such gases can be $O_2$, $CO_2$, CO, $N_2$, $NO_2$, NO, H2, etc. These channels exist within the aerogel pores 520 of the aerogel. By way of example, an oxygen absorber (such as strontium cobaltite), can optionally be placed in the channel to capture excess oxygen. Other materials can optionally be used to capture and release other gases. The embodiments described in relation to FIG. 5B may be applied to a continuous aerogel (not shown). In these embodiments, nanofibers are grown on an aerogel substrate (which in turn is on a more solid substrate 110). The aerogel substrate may include an oxygen absorber and the nanofibers may support the energy storage system 190 as discussed herein.

Figure 6:
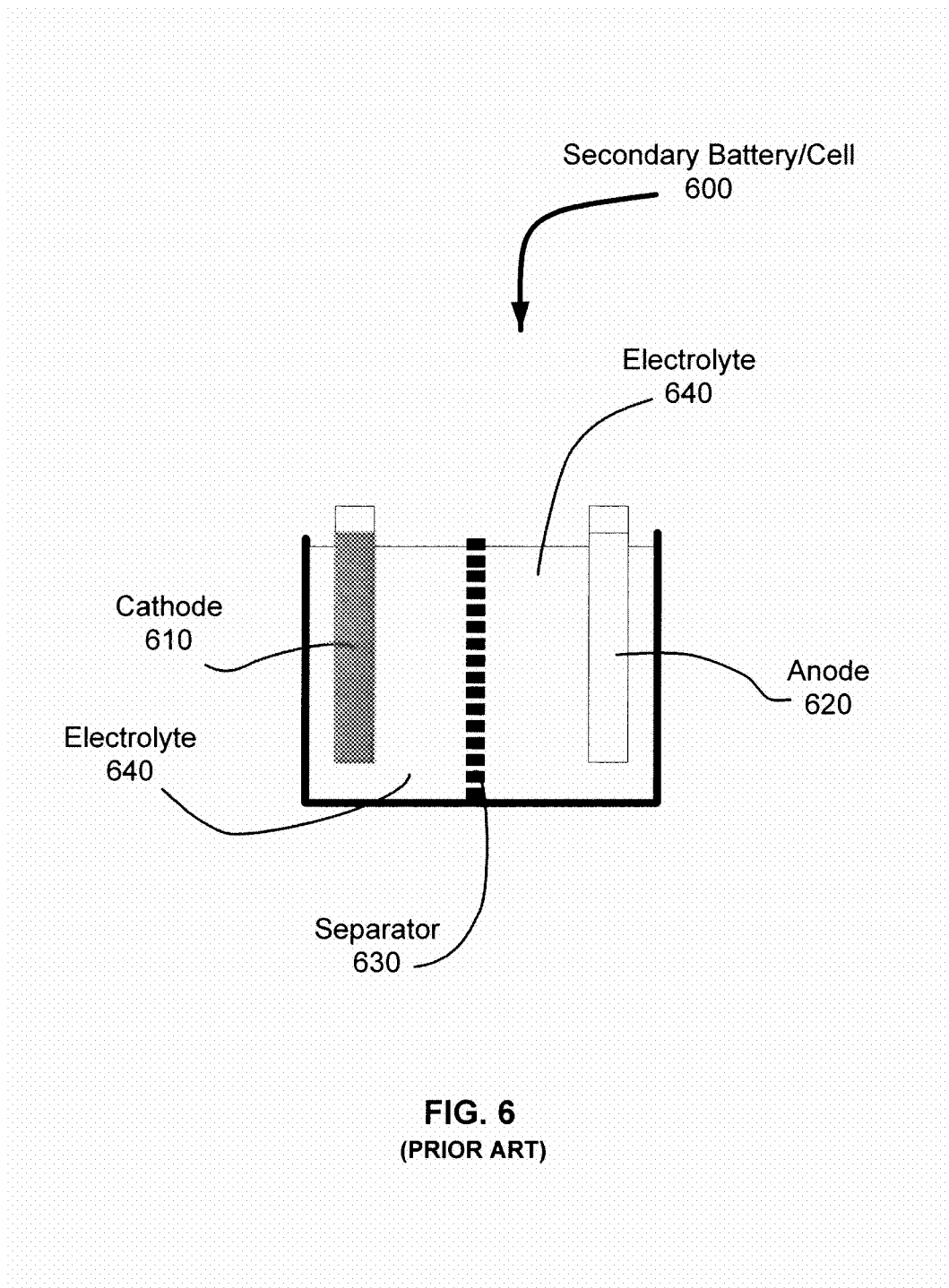
FIG. 6 illustrates a cross section of a prior art rechargeable battery.

FIG. 6 illustrates a cross section of a prior art rechargeable battery (e.g., a secondary battery/cell 600). This battery includes a cathode 610, an anode 620, a separator 630 and an electrolyte 640. The various embodiments illustrated in FIGS. 1-5 and discussed herein may be applied to either the cathode 610 or anode 620. The secondary battery/cell 600 may take many geometric forms and shapes as would be apparent to one of ordinary skill in the art. The cathode 610 may be open to the atmosphere or sealed from the atmosphere.

Figure 7:
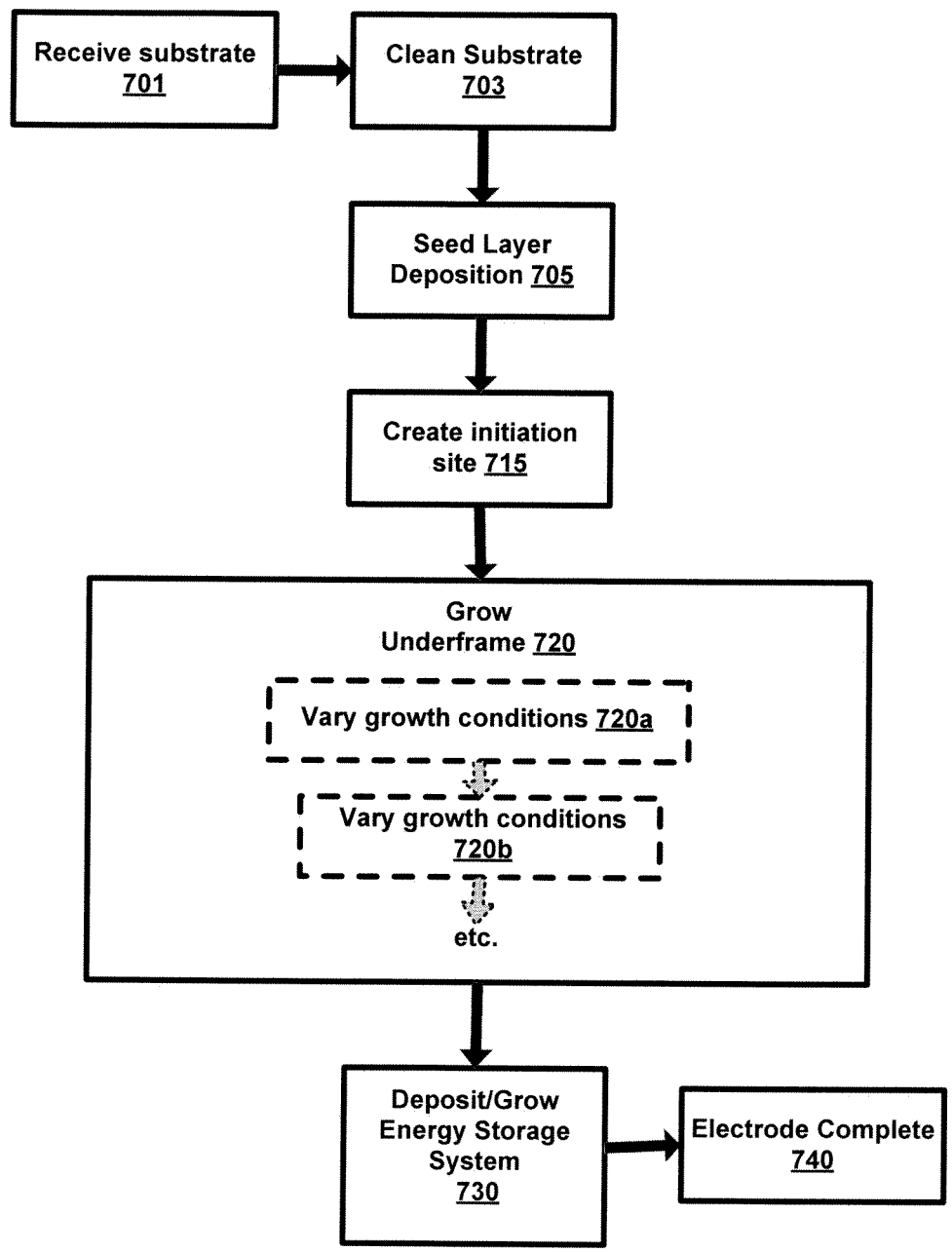
FIG. 7 illustrates methods of producing an electrode, according to various embodiments of the invention.

FIG. 7 illustrates a method for fabricating an electrode including an energy storage system 190 including an underframe 130. The first step 701 is to receive a substrate 110. Substrate 110 is optionally graphite coated aluminum, graphite, Ni, Ag, Fe, Mg, Pb, W, Al, Hf, Mo, Pd, Ta, Au, In, Nb, Ti, Zr, Cu, Li, Ni, V, Zn, C, carbides of previously noted materials, suicides of previously noted materials, oxides of previously noted materials, nitrides of previously noted materials, an oxygen permeable membrane, or any combination thereof. Note that the substrate 110 can include one material, or a combination of several materials. The substrate 110 can be of other materials, depending on the desired application. For instance, aerogel, stainless steel or graphite can be used for a substrate. Those skilled in the art of battery design can further specify other materials, depending on the desired application. In some embodiments substrate 110 is flexible and configured to be coiled.

An optional second step 703 is to clean the substrate 110. The purpose of cleaning 703 the substrate 110 is to prepare the substrate 110 for the subsequent depositions and growth of materials in later process steps. It is meant to remove any undesired organics, oxides, and other contaminates present on the substrate 110. The methods to clean the substrate 110 can range from physical (using an abrasive, for instance, to remove a thin layer of material that has been exposed to contaminants), to chemical (using a solvent, such as acetone, iso-propanol, TOE, or methanol) and/or chemical etch (citric acid soak/rinse, which dissolves part of the actual substrate, in the case of copper), or any combination of physical and chemical methods to appropriately prepare the surface 110 for subsequent process steps.

A third step 705 is an optional seed layer deposition. Seed layer deposition 705 is the process step where the base layer, or seed layer 115, for underframe 130 growth is created. This process step can be implemented through a gas phase (physical or chemical) deposition/growth, a liquid phase deposition/growth, or a solid phase deposition/growth, or any combination thereof.

Physical gas phase deposition techniques (where the material to be deposited is transported from the source to the substrate in the gas phase) can include: thermal evaporation, electron beam evaporation, DC sputtering, DC magnetron sputtering, RF sputtering, pulsed laser deposition, cathode arc deposition, and/or the like. It is also possible to use reactive physical vapor deposition, a method by which a 'contaminate gas' is injected into the chamber during the growth process, thereby incorporating itself into the layer as it grows.

Chemical gas phase deposition techniques (where chemical precursors are transported to the surface in the gas phase, and then subsequently undergo a chemical reaction at the surface) can include Low Pressure Chemical Vapor Deposition, Plasma-Enhanced Chemical Vapor Deposition, Atmospheric Pressure Chemical Vapor Deposition, Metal-Organic Chemical Vapor Deposition, Hot-wire Chemical Vapor Deposition, Very High Frequency Plasma Enhanced Chemical Vapor Deposition, Microwave Plasma Enhanced Chemical Vapor Deposition, and/or the like.

Liquid phase deposition techniques to create the seed layer 115 can include plating, electroplating, or chemical solution deposition, etc. Solid phase deposition techniques can include focused ion beam deposition. Another possibility for deposition is a solution that contains a liquid and a suspension of appropriate sized particles that are sprayed onto the current collector, and then the substrate is subsequently 'cured' such that the carrier solution is removed, leaving the particles intact on the surface of the substrate.

Any combination of the above process steps can be used to create an appropriate seed layer 115 for creating the initiation sites for the underframe 130 growth.

A forth step 715 in the process is the creation of the initiation sites, defined as the location where the underframe 130 starts growth on the seed layer 115. This step is dependent on methods chosen to create the seed layer 115. For instance, the initiation sites separation distance can be determined by the thickness and materials chosen for seed layer deposition 705. For instance, a seed layer of 3000 angstroms nickel/300 angstroms chrome will produce a certain number of initiation sites per square centimeter. If the thickness of the nickel is reduced to 2000 angstroms, the number of initiation sites per square centimeter will be different than that for a thickness of 3000 angstroms nickel. If another material is chosen, such as iron to replace nickel, the resultant initiation sites per square centimeter will also be different. Step 715 is optionally part of step 705.

A solid phase deposition technique can allow for control of the initiation sites per square centimeter. This can be a focused ion beam deposition, where the initiation sites/cm$^2$ are directly controlled by the by where the focused ion beam deposits it material, or a nano-particle suspension, where the initiation sites/cm$^2$ is controlled by the number of nano-particles contained in a given suspension volume. The number of initiation sites can also be controlled by the size of the focused ion beam deposition site, or the size of the nano-particles in solution, etc.

The initiation sites are typically created when a reactor in which the electrode is produced reaches the appropriate reaction temperature with the appropriate feedstock gases flowing, and the feedstock gas begins to catalyze with the seed layer 115. The initiation sites have thus been created, and the underframe 130 growth has commenced.

A fifth step 720 is to grow the underframe 130. There are a number of growth processes available to grow the underframe 130. For example, chemical Vapor Deposition, Thermal Chemical Vapor Deposition, Vapor-Liquid-Solid growth (a type of CVD), and Plasma Enhanced Chemical Vapor Deposition, are processes by which Nano-Tube (NT), Nano-Fiber (NF), and Nano-Wire (NW) growth has been achieved. Those skilled in the art of filament growth will recognize that there are other growth methods available.

Examples of feedstock gases that can be used to grow NT/NF are carbon monoxide, methane, ethane, ethylene, acetylene, and/or the like. It is also possible to use other hydrocarbons or inorganic compounds for the growth process.

Of interest is the Plasma Enhanced Chemical Vapor Deposition (CVD) method, due to the fact that the growth of the support filament 110 aligns with the electric field of the plasma, thus allowing for the production of vertically aligned underframe 130. Thermal CVD, under certain process conditions, can also produce vertically aligned underframe 130 units. Further, Water-Assisted CVD makes possible very high aspect ratio vertically aligned underframe 130 (length vs. diameter roughly equal to 1,000,000), allowing for very tall underframe 130.

It has also been demonstrated that appropriately modified bacteria and viruses have grown to nanowire and nanofiber structures. Such techniques are optionally used to create underframe 130.

It is also possible to use several of the techniques together at once, with the appropriate choice of material. For instance, bacteria/viruses can be used to grow the NT/NF/NW in the presence of an applied electric field, producing vertically aligned support filaments. Another method of underframe 130 growth is to apply an electric and/or magnetic field during VLS growth to control the trajectory of the growing NT/NF/NW, this controlling the three dimensional shape of the underframe 130. Another technique is to begin growth of the NT/NF/NW underframe 130 with the reactor operating in PECVD mode; after a specified time, the reactor can be converted to Thermal CVD mode; and then again, after a specified time, the reactor is converted back to PECVD mode. Those skilled in the art of NT/NF/NW growth can appreciate that there are other possible combinations that allow for appropriate growth control of the support filament 110.

The underframe height 290 of the underframe 130 is generally determined by the duration of the growth process. The temperature of the reactor, the feedstock gases used, and the combination and strength of applied electric and magnetic fields (or the absence thereof) can influence the speed and amount of filament growth.

The diameter 210 of the underframe 130 is generally determined by the thickness of the seed layer 115, or the size of the nano-particles contained in suspension, if a nano-particle suspension method is chosen to create the seed layer 115, or the size of the ion beam, if focused ion beam deposition is chosen to create the seed layer 115. The temperature of the reactor, the feedstock gases used, and the combination and strength of applied electric and magnetic fields (or the absence thereof) can influence diameter of the underframe 130 as well. This also applies to diameters 225, 230, and 240.

During the growth step 720 of underframe 130, it is possible to implement a sub-step 720a, where the diameter and number of branches can be affected. This can be accomplished by changing temperature of the reactor, the feedstock gases used and their relative compositions and flow rates, direction and strength of applied electric and magnetic fields (or the absence thereof). The duration of the change implicitly determines the diameters 210 225, 230 and 240), as well as the amount of branching, as shown in FIG. 2D.

During the growth step 720 of underframe 130, it is possible to implement a sub-step 720*b*, where the diameter and number of branches can be affected. This can be accomplished by changing temperature of the reactor, the feedstock gases used and their relative compositions and flow rates, direction and strength of applied electric and magnetic fields (or the absence thereof). The duration of the change implicitly determines the NT/NF diameter 210 (as well as the other diameters 225, 230, and 240), as well as the amount of branching, as shown in FIG. 2D.

The diameter, thickness, height, and branches of underframe 130 are largely controlled by the changes in the aforementioned parameters; this can be done on a somewhat continuous basis by changing the input parameters for growth, creating the equivalent sub-steps 720*c*, 720*d*, etc., until it is decided to terminate growth.

If an aerogel is desired, the growth process requires the preparation and setting of a gel on the optional seed layer 115. In some embodiments, when ageing of the gel is complete, the gel is exchanged into 200 proof ethanol (or acetone) about four times over the course of a week. After one week, supercritically dry the gel. Thus, an aerogel is produced. Note that the template size can be defined by mechanically masking the locations where the aerogel is desired. Alternatively, the size of the aerogel template can be defined by photolithography. The thickness of the aerogel template can be defined by the thickness of the originally deposited gel on the seed layer 115/substrate 110.

The eighth process step 730 is deposit/grow the energy storage system 190. The growth/deposition of the energy storage system 190 can be implemented through a gas phase (physical or chemical) deposition/growth, a liquid phase deposition/growth, or a solid phase deposition/growth, or any combination thereof.

Physical gas phase deposition techniques (where the material to be deposited is transported from the source to the substrate in the gas phase) can include: thermal evaporation, electron beam evaporation, DC sputtering, DC magnetron sputtering, RF sputtering, pulsed laser deposition, cathode arc deposition, and/or the like. It is also possible to use reactive physical vapor deposition, a method by which a 'contaminate gas' is injected into the chamber during the growth process, thereby incorporating itself into the layer as it grows.

Chemical gas phase deposition techniques (where chemical precursors are transported to the surface in the gas phase, and then subsequently undergo a chemical reaction at the surface) can include Low Pressure Chemical Vapor Deposition, Plasma-Enhanced Chemical Vapor Deposition, Atmospheric Pressure Chemical Vapor Deposition, Metal-Organic Chemical Vapor Deposition, Hot-wire Chemical Vapor Deposition, Very High Frequency Plasma Enhanced Chemical Vapor Deposition, Microwave Plasma Enhanced Chemical Vapor Deposition, and/or the like.

Note that in any deposition stage more than one material can be deposited at a time. For instance, two (or more) different types of metal can be deposited/grown at the same time, such as tin (Sn) and gold (Au); two (or more) different types of semiconductor can be deposited/grown, such as silicon (Si) and germanium (Ge); two (or more) different types of oxide may be grown/deposited, such as lithium iron phosphate ($LiFePO_4$) and lithium nickel cobalt manganese ($Li(NiCoMn)O_2$). Additionally, it is possible to mix material types, such as a metal and a semiconductor, or a semiconductor and an oxide, or a metal and an oxide, or a metal, semiconductor, and oxide. Examples include silicon (Si) and lithium (Li) co-depositions, silicon (Si) and $LiO_2$ (or $SiO_2$) co-depositions, and silicon (Si), lithium (Li), and $LiO_2$ (or $SiO_2$) co-depositions. It may be desirable to co-deposit insulating material as well, such as silicon dioxide ($SiO_2$), or silicon nitride ($Si_3N_4$). Additionally, it may be desirable to co-deposit carbon (C) as well. Note that depositing of active materials (such as $Li_2O_2$, $Li_2O$, lithiated $TiS_2$, $LiOH*H_2O$, LiOH, ($LiMO_2$, M=Mn, Ni, Co), $LiFePO_4$, lithiated $TiO_2$, and/or any combination thereof) can optionally be performed simultaneously with catalyst materials (such as gold, platinum, MnO, CuFe, beta-$MnO_2$/Pt, Pd, Ru, MoN/NGS, $Li_5FeO_4$, $Li_2MnO_3*LiFeO_2$, $FeO_4$, $CoFe_2O_4$, TiN, TiC, $TiO_2$, or any combination thereof).

The energy storage system 190 is optionally created by a liquid phase process, such as electro-less deposition or electro-plating. It is also possible to create the energy storage system 190 by coating the underframes 130 with a solution containing active materials (such as $Li_2O_2$, $Li_2O$, lithiated $TiS_2$, $LiOH*H_2O$, LiOH, ($LiMO_2$, M=Mn, Ni, Co), $LiFePO_4$, lithiated $TiO_2$, and/or any combination thereof) and/or catalyst materials (such as gold, platinum, MnO, CuFe, beta-$MnO_2$/Pt, Pd, Ru, MoN/NGS, $Li_5FeO_4$, $Li_2MnO_3*LiFeO_2$, $FeO_4$, $CoFe_2O_4$, TiN, TiC, $TiO_2$, or any combination thereof), suspended in a binder solvent matrix. After appropriate processing, the solvent is driven out of the matrix, leaving only the binder and active/and/or catalyst material, thus creating an electrode including underframe 130 and energy storage system 190. This technique can be applied to both an anode and cathode, with appropriate choice of materials.

In some embodiments, the reactivity of the energy storage system 190 is controlled by appropriately choosing the deposition and growth technique. For instance, it is possible include catalyst materials during the deposition process of the active layer 150.

In some embodiments, the deposited/grown energy storage system is encapsulated. This encapsulation could be gel electrolyes, such as P(VDF-HFP)-based polymer electrolytes, poly acrylic acid, and polyfluorene-based conducting polymers, incorporating a carbon-oxygen functional group (carbonyl).

At step 740 the electrode fabrication may be complete. The electrode is optionally included within a battery.

As used herein, the term "nanofibers" is meant to include nano-ribbon, nano-filaments, unzipped nanotubes, nanowires and/or nanotubes.

Several embodiments are specifically illustrated and/or described herein. However, it will be appreciated that modifications and variations are covered by the above teachings and within the scope of the appended claims without departing from the spirit and intended scope thereof. For example, energy storage systems 190 are optionally formed on both sides of Substrate 110. The teachings disclosed herein may be applied to both batteries and hybrid battery/capacitors. In some embodiments material catalyzer 310 migrates from one layer to another during operation. In some embodiments, the particles discussed herein are multi-layered or hollow particles.

The embodiments discussed herein are illustrative of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. A battery anode comprising:
   a substrate;
   a plurality of support structures attached to the substrate;
   an active layer configured to receive lithium from an electrolyte with nanoparticles interspersed within the active layer; and
   an under-layer disposed between the active layer and the support structures, the under-layer including lithium;
   wherein the under-layer contains active material catalyzers which are disposed in a concentration gradient in the under-layer.

2. The anode of claim 1, wherein the under-layer includes a lithium salt.

3. The anode of claim 1, disposed in a battery.

4. The anode of claim 1, wherein the active layer includes silicon.

5. The anode of claim 1, wherein the support structures include nanotubes, nanofibers or nanowires.

* * * * *